(12) United States Patent
Min et al.

(10) Patent No.: US 8,989,266 B2
(45) Date of Patent: Mar. 24, 2015

(54) METHOD AND APPARATUS FOR ENCODING VIDEO, AND METHOD AND APPARATUS FOR DECODING VIDEO

(71) Applicant: Samsung Electronics Co., Ltd., Gyeonggi-do (KR)

(72) Inventors: Jung-hye Min, Suwon-si (KR); Woo-jin Han, Suwon-si (KR); Il-koo Kim, Osan-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/874,876

(22) Filed: May 1, 2013

(65) Prior Publication Data

US 2013/0315303 A1   Nov. 28, 2013

Related U.S. Application Data

(63) Continuation of application No. 13/371,975, filed on Feb. 13, 2012, which is a continuation of application No. 12/857,798, filed on Aug. 17, 2010.

(30) Foreign Application Priority Data

Aug. 17, 2009   (KR) ........................ 10-2009-0075855

(51) Int. Cl.
| | |
|---|---|
| *H04N 7/12* | (2006.01) |
| *H04N 11/02* | (2006.01) |
| *H04N 11/04* | (2006.01) |
| *H04N 19/593* | (2014.01) |
| *H04N 19/105* | (2014.01) |

(Continued)

(52) U.S. Cl.
CPC ... *H04N 19/00763* (2013.01); *H04N 19/00024* (2013.01); *H04N 19/00969* (2013.01); *H04N 19/00042* (2013.01); *H04N 19/00569* (2013.01); *H04N 19/00066* (2013.01); *H04N 19/00278* (2013.01); *H04N 19/00896* (2013.01); *H04N 19/00303* (2013.01); *H04N 19/00533* (2013.01)
USPC .................................................... 375/240.12

(58) Field of Classification Search
USPC .................................................... 375/240.12
See application file for complete search history.

(56) References Cited

U.S. PATENT DOCUMENTS

| | | | |
|---|---|---|---|
| 7,162,091 | B2 | 1/2007 | Wang et al. |
| 7,653,133 | B2 | 1/2010 | Woods et al. |

(Continued)

FOREIGN PATENT DOCUMENTS

| | | | |
|---|---|---|---|
| EP | 2 081 386 A1 | 7/2009 | |
| EP | 2 557 797 A2 | 2/2013 | |

(Continued)

OTHER PUBLICATIONS

Communication dated Jul. 29, 2013 issued by the Australian Patent Office in counterpart Australian Patent Application No. 2010285492.

(Continued)

*Primary Examiner* — Chikaodili E Anyikire
(74) *Attorney, Agent, or Firm* — Sughrue Mion, PLLC

(57) ABSTRACT

Disclosed are a method and a apparatus for encoding a video, and a method and apparatus for decoding a video, in which neighboring pixels used to perform intra prediction on a current block to be encoded are filtered and intra prediction is performed by using the filtered neighboring pixels.

5 Claims, 21 Drawing Sheets

(51) Int. Cl.
| | | |
|---|---|---|
| H04N 19/96 | (2014.01) | |
| H04N 19/11 | (2014.01) | |
| H04N 19/50 | (2014.01) | |
| H04N 19/117 | (2014.01) | |
| H04N 19/176 | (2014.01) | |
| H04N 19/82 | (2014.01) | |
| H04N 19/182 | (2014.01) | |
| H04N 19/44 | (2014.01) | |

(56) References Cited

U.S. PATENT DOCUMENTS

| | | |
|---|---|---|
| 7,751,478 B2 | 7/2010 | Kim et al. |
| 7,957,585 B2 | 6/2011 | Kim et al. |
| 2004/0136458 A1 | 7/2004 | Dahlhoff et al. |
| 2006/0029136 A1 | 2/2006 | Cieplinski et al. |
| 2006/0126727 A1 | 6/2006 | Kim et al. |
| 2006/0165170 A1 | 7/2006 | Kim et al. |
| 2006/0193388 A1 | 8/2006 | Woods et al. |
| 2007/0133891 A1 | 6/2007 | Jeong |
| 2007/0171969 A1 | 7/2007 | Han et al. |
| 2007/0253483 A1 | 11/2007 | Lee et al. |
| 2008/0075166 A1 | 3/2008 | Gish et al. |
| 2009/0141798 A1 | 6/2009 | Adachi et al. |
| 2010/0284458 A1 | 11/2010 | Andersson et al. |
| 2011/0007800 A1 | 1/2011 | Zheng et al. |
| 2011/0200111 A1 | 8/2011 | Chen et al. |

FOREIGN PATENT DOCUMENTS

| | | |
|---|---|---|
| JP | 2006-5438 A | 1/2006 |
| JP | 2006-174454 A | 6/2006 |
| JP | 2006-203909 A | 8/2006 |
| JP | 2007-503784 A | 2/2007 |
| JP | 2007-166617 A | 6/2007 |
| JP | 2007-288785 A | 11/2007 |
| JP | 2011-30175 A | 2/2011 |
| KR | 10-2006-0043051 A | 5/2006 |
| KR | 10-2006-0066346 A | 6/2006 |
| RU | 2 329 615 C2 | 1/2008 |
| WO | 2005055606 A1 | 6/2005 |
| WO | 2008/085109 A1 | 7/2008 |
| WO | 2009/090884 A1 | 7/2009 |

OTHER PUBLICATIONS

Communication dated Oct. 1, 2013 issued by the Japanese Patent Office in counterpart Japanese Patent Application No. 2013-168575.
Kim, et al., "Enlarging MB size for high fidelity video coding beyond HD", ITU-Telecommunications Standardization Sector, Study Group 16 Question 6, Video Coding Experts Group (VCEG), Oct. 8-10, 2008, pp. 1-6.
Communication dated Nov. 19, 2013, issued by the Canadian Intellectual Property Office in counterpart Canadian Application No. 2,768,694.
Communication dated Oct. 28, 2013, issued by the Federal Service for Intellectual Property in counterpart Russian Application No. 2013114272.
Communication dated Nov. 5, 2013, issued by the Federal Service for Intellectual Property in counterpart Russian Application No. 2012105532.
International Search Report issued on Feb. 23, 2011 in the corresponding International Patent Application No. PCT/KR2010/005437.
Communication dated Mar. 15, 2013, isused by the Russian Patent Office in counterpart Russian Application No. 2012105532.
Communication dated May 20, 2014 issued by the Japanese Patent Office in counterpart Japanese Patent Application No. 2012-525480.
Mathias Wien et al.; "ABT Coding for Higher Resolution Video"; Joint Video Team (JVT) of ISO/IEC MPEG & ITU-T VCEG (ISO/IEC JTC1/SC29/WG11 and ITU-T SG16 Q.6), 2nd Meeting; Jan. 29-Feb. 1, 2002; pp. 1-30; 31 sheets.
Jaeil Kim et al.; "Enlarging MB size for high fidelity video coding beyond HD"; ITU—Telecommunications Standardization Sector, Study Group 16 Questions 6, Video Coding Experts Group (VCEG), 36th Meeting, San Diego, USA, Oct. 8-10, 2008; pp. 1-6; 7 sheets.
Sung-Chang Lim et al., "Intra coding using extended block size"; ITU—Telecommunications Standardization Sector, Study Group 16 Questions 6, Video Coding Experts Group (VCEG), 38th Meeting, London, UK/Geneva, CH, Jul. 1-8, 2009; pp. 1-5; 6 sheets.
Takeshi Tsukuba et al., "Adaptive Multidirectional Intra Prediction"; ITU—Telecommunications Standardization Sector, Study Group 16 Question 6, Video Coding Experts Group (VCEG), 33rd Meeting, Shenzhen, China, Oct. 20, 2007; pp. 1-6; 7 sheets.
Virginie Drugeon, et al. "High Precision Edge, Prediction for Intra Coding"; Proceedings of the 15th IEEE Int. Conf. on Image Processing 2008; Oct. 2008; Panasonic R&D Center Germany GmbH; pp. 1620-1623; 8 sheets.
Mathias Wien, "Variable Block-Size Transforms for H.264/AVC"; IEEE Transactions on Circuits and Systems for Video Technology, vol. 13, No. 7, Jul. 2003; pp. 604-613; 13 sheets.
Non Patent Literature cited in Japanese Patent Application No. 2012-526480 (wftp3.itu.int - /av-arch/jvt-site/2002_01_Geneva/).
Non Patent Literature cited in Japanese Patent Application No. 2012-526480 (wftp3.itu.int - /av-arch/video-site/0810_San/).
Non Patent Literature cited in Japanese Patent Application No. 2012-525480 (wftp3.itu.int - /av-arch/video-site/0906_LG/).
Non Patent Literature cited in Japanese Patent Application No. 2012-525480 (wftp3.itu.int - /av-arch/video-site/0710_She/).
Communication from the Indonesian Patent Office dated Feb. 20, 2014, in a counterpart Indonesia application No. W-00201200065.
Communication dated Mar. 18, 2014 from the State Intellectual Property Office of P.R. China in a counterpart application No. 201080036788.1.
Communication dated May 7, 2014 from the Korean Intellectual Property Office in a counterpart Korean application No. 10-2009-0075855.
Communication dated Aug. 28, 2014 issued by the European Patent Office in counterpart European Patent Application No. 13185302.0.
Communication dated Aug. 28, 2014 issued by the European Patent Office in counterpart European Patent Application No. 10810147.8.
Detlev Marpe et al.; H.264/MPEG4-AVC Fidelity Range Extensions: Tools, Profiles, Performance, and Application Areas; Image Processing, 2005. ICIP 2005. IEEE International Conference; vol. 1; Sep. 2005; 4 pages total; XP010850819.
Martin Winken et al.; "Description of video coding technology proposal by Fraunhofer HHI"; Joint Collaborative Team on Video Coding (JCT-VC); Apr. 2010; pp. 1-44; XP030007557.
Communication, Issued by the Canadian Intellectual Property Office, Dated Dec. 2, 2014, in counterpart Canadian Application No. 2,768,694.
Communication, Issued by the Federal Service for Intellectual Property, Dated Oct. 22, 2014, in counterpart Russian Application No. 2014101050.

CODING UNITS (1010)

| SIZE OF CODING UNIT | NUMBER OF PREDICTION MODES | | |
|---|---|---|---|
| | EXAMPLE 1 | EXAMPLE 2 | EXAMPLE 3 |
| 2 | – | 5 | 5 |
| 4 | 9 | 9 | 9 |
| 8 | 9 | 9 | 9 |
| 16 | 33 | 17 | 11 |
| 32 | 33 | 33 | 33 |
| 64 | 5 | 5 | 9 |
| 128 | 5 | 5 | 5 |

| PREDICTION MODE | NAME |
|---|---|
| 0 | VERTICAL |
| 1 | HORIZONTAL |
| 2 | DC |
| 3 | DOWN_LEFT |
| 4 | DOWN_RIGHT |
| 5 | VERTICAL_RIGHT |
| 6 | HORIZONTAL_DOWN |
| 7 | VERTICAL_LEFT |
| 8 | HORIZONTAL_UP |

● : NEIGHBORING PIXEL
◎ : PIXEL OF CURRENT CODING UNIT

METHOD AND APPARATUS FOR ENCODING VIDEO, AND METHOD AND APPARATUS FOR DECODING VIDEO

CROSS-REFERENCE TO RELATED PATENT APPLICATION

This application is a continuation application of U.S. application Ser. No. 13/371,975, filed on Feb. 13, 2012, in the U.S. Patent and Trademark Office, which is a continuation application of U.S. application Ser. No. 12/857,798, filed on Aug. 17, 2010, in the U.S. Patent and Trademark Office, which claims priority from Korean Patent Application No. 10-2009-0075855, filed on Aug. 17, 2009, in the Korean Intellectual Property Office, the disclosures of which are incorporated herein in their entireties by reference.

BACKGROUND

1. Field

The exemplary embodiments relate to a method and apparatus for encoding a video, and a method and apparatus for decoding a video, capable of improving video compression efficiency by performing intra prediction by using filtered neighboring pixels.

2. Description of the Related Art

In video compression methods such as MPEG-1, MPEG-2, MPEG-4, and H.264/MPEG-4 Advanced Video Coding (AVC), one picture is split into macroblocks to encode a video. After that, every macroblock is encoded according to all encoding modes available in inter prediction and intra prediction, and then one encoding mode is selected according to a bit rate required to encode the macroblock and distortion between the original macroblock and a decoded macroblock, so as to encode the macroblock.

As hardware for reproducing and storing high resolution or high quality video content is being developed and supplied, a need for a video codec for effectively encoding or decoding the high resolution or high quality video content is increasing. In a conventional video codec, a video is encoded according to a limited prediction mode based on a macroblock having a predetermined size.

SUMMARY

The exemplary embodiments provide a method and apparatus for encoding a video, and a method and apparatus for decoding a video, capable of improving video compression efficiency by filtering neighboring pixels of a current block and performing intra prediction on the current block by using the filtered neighboring pixels.

According to an aspect of an exemplary embodiment, there is provided a video encoding method including filtering neighboring pixels of a current block to be encoded so as to generate filtered neighboring pixels; selecting the filtered neighboring pixels or the original neighboring pixels as reference pixels to be used to perform intra prediction on the current block; and performing intra prediction on the current block by using the selected reference pixels.

According to another aspect of the exemplary embodiment, there is provided a video decoding method including filtering neighboring pixels of a current block to be decoded so as to generate filtered neighboring pixels; extracting information about an intra prediction mode applied to the current block from a bitstream; selecting the filtered neighboring pixels or the original neighboring pixels as reference pixels to be used to perform intra prediction on the current block; and performing intra prediction on the current block by using the extracted information about the intra prediction mode and the selected reference pixels.

According to another aspect of an exemplary embodiment, there is provided a video encoding apparatus including a neighboring pixel filtering unit for filtering neighboring pixels of a current block to be encoded so as to generate filtered neighboring pixels; a reference pixel determining unit for selecting the filtered neighboring pixels or the original neighboring pixels as reference pixels to be used to perform intra prediction on the current block; and an intra prediction performing unit for performing intra prediction on the current block by using the selected reference pixels.

According to another aspect of an exemplary embodiment, there is provided a video decoding apparatus including a neighboring pixel filtering unit for filtering neighboring pixels of a current block to be decoded so as to generate filtered neighboring pixels; an entropy decoder for extracting information about an intra prediction mode applied to the current block from a bitstream; a reference pixel determining unit for selecting the filtered neighboring pixels or the original neighboring pixels as reference pixels to be used to perform intra prediction on the current block; and an intra prediction performing unit for performing intra prediction on the current block by using the extracted information about the intra prediction mode and the selected reference pixels.

BRIEF DESCRIPTION OF THE DRAWINGS

The above and other features of the exemplary embodiment will become more apparent by describing in detail exemplary embodiments thereof with reference to the attached drawings in which.

DETAILED DESCRIPTION

Hereinafter, the exemplary embodiments will be described more fully with reference to the accompanying drawings, in which exemplary embodiments are shown. In the exemplary embodiments, "unit" may or may not refer to a unit of size, depending on its context. In the present specification, an "image" may denote a still image for a video or a moving image, that is, the video itself.

Hereinafter, a 'coding unit' is an encoding data unit in which the image data is encoded at an encoder side and an encoded data unit in which the encoded image data is decoded at a decoder side, according to exemplary embodiments. Also, a 'coded depth' means a depth where a coding unit is encoded.

Firstly, a method and apparatus for encoding video and a method and apparatus for decoding video, according to an exemplary embodiment, will be described with reference to FIGS. 1 to 13.

Figure 1:
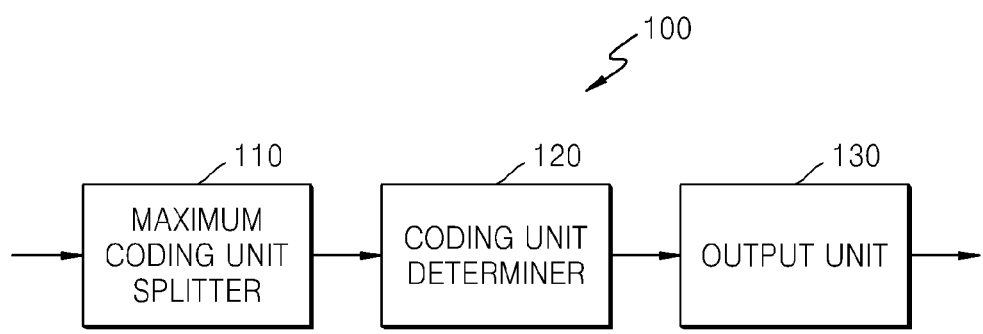
FIG. 1 is a block diagram of an apparatus for encoding a video, according to an exemplary embodiment.

FIG. 1 is a block diagram of a video encoding apparatus 100, according to an exemplary embodiment.

The video encoding apparatus 100 includes a maximum coding unit splitter 110, a coding unit determiner 120, and an output unit 130.

The maximum coding unit splitter 110 may split a current picture based on a maximum coding unit for the current picture of an image. If the current picture is larger than the maximum coding unit, image data of the current picture may be split into the at least one maximum coding unit. The maximum coding unit according to an exemplary embodiment may be a data unit having a size of 32×32, 64×64, 128×128, 256×256, etc., wherein a shape of the data unit is a square having a width and height in squares of 2. The image data may be output to the coding unit determiner 120 according to the at least one maximum coding unit.

A coding unit according to an exemplary embodiment may be characterized by a maximum size and a depth. The depth denotes a number of times the coding unit is spatially split from the maximum coding unit, and as the depth deepens or increases, deeper encoding units according to depths may be split from the maximum coding unit to a minimum coding unit. A depth of the maximum coding unit is an uppermost depth and a depth of the minimum coding unit is a lowermost depth. Since a size of a coding unit corresponding to each depth decreases as the depth of the maximum coding unit deepens, a coding unit corresponding to an upper depth may include a plurality of coding units corresponding to lower depths.

As described above, the image data of the current picture is split into the maximum coding units according to a maximum size of the coding unit, and each of the maximum coding units may include deeper coding units that are split according to depths. Since the maximum coding unit according to an exemplary embodiment is split according to depths, the image data of a spatial domain included in the maximum coding unit may be hierarchically classified according to depths.

A maximum depth and a maximum size of a coding unit, which limit the total number of times a height and a width of the maximum coding unit are hierarchically split may be predetermined.

The coding unit determiner 120 encodes at least one split region obtained by splitting a region of the maximum coding unit according to depths, and determines a depth to output a finally encoded image data according to the at least one split region. In other words, the coding unit determiner 120 determines a coded depth by encoding the image data in the deeper coding units according to depths, according to the maximum coding unit of the current picture, and selects a depth having the least encoding error. Thus, the encoded image data of the coding unit corresponding to the determined coded depth is finally output. Also, the coding units corresponding to the coded depth may be regarded as encoded coding units.

The determined coded depth and the encoded image data according to the determined coded depth are output to the output unit 130.

The image data in the maximum coding unit is encoded based on the deeper coding units corresponding to at least one depth equal to or below the maximum depth, and results of encoding the image data are compared based on each of the deeper coding units. A depth having the least encoding error may be selected after comparing encoding errors of the deeper coding units. At least one coded depth may be selected for each maximum coding unit.

The size of the maximum coding unit is split as a coding unit is hierarchically split according to depths, and as the number of coding units increases. Also, even if coding units correspond to same depth in one maximum coding unit, it is determined whether to split each of the coding units corresponding to the same depth to a lower depth by measuring an encoding error of the image data of the each coding unit, separately. Accordingly, even when image data is included in one maximum coding unit, the image data is split to regions according to the depths and the encoding errors may differ according to regions in the one maximum coding unit, and thus the coded depths may differ according to regions in the image data. Thus, one or more coded depths may be determined in one maximum coding unit, and the image data of the maximum coding unit may be divided according to coding units of at least one coded depth.

Accordingly, the coding unit determiner 120 may determine coding units having a tree structure included in the maximum coding unit. The 'coding units having a tree structure' according to an exemplary embodiment include coding units corresponding to a depth determined to be the coded depth, from among all deeper coding units included in the maximum coding unit. A coding unit of a coded depth may be hierarchically determined according to depths in the same region of the maximum coding unit, and may be independently determined in different regions. Similarly, a coded depth in a current region may be independently determined from a coded depth in another region.

A maximum depth according to an exemplary embodiment is an index related to the number of splitting times from a maximum coding unit to a minimum coding unit. A first maximum depth according to an exemplary embodiment may denote the total number of splitting times from the maximum coding unit to the minimum coding unit. A second maximum depth according to an exemplary embodiment may denote the total number of depth levels from the maximum coding unit to the minimum coding unit. For example, when a depth of the maximum coding unit is 0, a depth of a coding unit, in which the maximum coding unit is split once, may be set to 1, and a depth of a coding unit, in which the maximum coding unit is split twice, may be set to 2. Here, if the minimum coding unit is a coding unit in which the maximum coding unit is split four times, 5 depth levels of depths 0, 1, 2, 3 and 4 exist, and thus the first maximum depth may be set to 4, and the second maximum depth may be set to 5.

Prediction encoding and transformation may be performed according to the maximum coding unit. The prediction encoding and the transformation are also performed based on the deeper coding units according to a depth equal to or depths less than the maximum depth, according to the maximum coding unit. Transformation may be performed according to method of orthogonal transformation or integer transformation.

Since the number of deeper coding units increases whenever the maximum coding unit is split according to depths, encoding including the prediction encoding and the transformation is performed on all of the deeper coding units generated as the depth deepens. For convenience of description, the prediction encoding and the transformation will now be described based on a coding unit of a current depth, in a maximum coding unit.

The video encoding apparatus 100 may variably select a size or shape of a data unit for encoding the image data. In order to encode the image data, operations, such as prediction encoding, transformation, and entropy encoding, are performed, and at this time, the same data unit may be used for all operations or different data units may be used for each operation.

For example, the video encoding apparatus 100 may select not only a coding unit for encoding the image data, but also a data unit different from the coding unit so as to perform the prediction encoding on the image data in the coding unit.

In order to perform prediction encoding in the maximum coding unit, the prediction encoding may be performed based on a coding unit corresponding to a coded depth, i.e., based on a coding unit that is no longer split to coding units corresponding to a lower depth. Hereinafter, the coding unit that is no longer split and becomes a basis unit for prediction encoding will now be referred to as a 'prediction unit'. A partition obtained by splitting the prediction unit may include a prediction unit or a data unit obtained by splitting at least one of a height and a width of the prediction unit.

For example, when a coding unit of 2N×2N (where N is a positive integer) is no longer split and becomes a prediction unit of 2N×2N, and a size of a partition may be 2N×2N, 2N×N, N×2N, or N×N. Examples of a partition type include symmetrical partitions that are obtained by symmetrically splitting a height or width of the prediction unit, partitions obtained by asymmetrically splitting the height or width of the prediction unit, such as 1:n or n:1, partitions that are obtained by geometrically splitting the prediction unit, and partitions having arbitrary shapes.

A prediction mode of the prediction unit may be at least one of an intra mode, a inter mode, and a skip mode. For example, the intra mode or the inter mode may be performed on the partition of 2N×2N, 2N×N, N×2N, or N×N. Also, the skip mode may be performed only on the partition of 2N×2N. The encoding is independently performed on one prediction unit in a coding unit, thereby selecting a prediction mode having a least encoding error.

The video encoding apparatus 100 may also perform the transformation on the image data in a coding unit based not only on the coding unit for encoding the image data, but also based on a data unit that is different from the coding unit.

In order to perform the transformation in the coding unit, the transformation may be performed based on a data unit having a size smaller than or equal to the coding unit. For example, the data unit for the transformation may include a data unit for an intra mode and a data unit for an inter mode.

A data unit used as a base of the transformation will now be referred to as a 'transform unit'. A transformation depth indicating the number of splitting times to reach the transform unit by splitting the height and width of the coding unit may also be set in the transform unit. For example, in a current coding unit of 2N×2N, a transformation depth may be 0 when the size of a transform unit is also 2N×2N, may be 1 when each of the height and width of the current coding unit is split into two equal parts, totally split into $4^1$ transform units, and the size of the transform unit is thus N×N, and may be 2 when each of the height and width of the current coding unit is split into four equal parts, totally split into $4^2$ transform units and the size of the transform unit is thus N/2×N/2. For example, the transform unit may be set according to a hierarchical tree structure, in which a transform unit of an upper transformation depth is split into four transform units of a lower transformation depth according to the hierarchical characteristics of a transformation depth.

Similar to the coding unit, the transform unit in the coding unit may be recursively split into smaller sized regions, so that the transform unit may be determined independently in units of regions. Thus, residual data in the coding unit may be divided according to the transformation having the tree structure according to transformation depths.

Encoding information according to coding units corresponding to a coded depth requires not only information about the coded depth, but also about information related to prediction encoding and transformation. Accordingly, the coding unit determiner 120 not only determines a coded depth having a least encoding error, but also determines a partition type in a prediction unit, a prediction mode according to prediction units, and a size of a transform unit for transformation.

Coding units according to a tree structure in a maximum coding unit and a method of determining a partition, according to exemplary embodiments, will be described in detail later with reference to FIGS. 3 through 12.

The coding unit determiner 120 may measure an encoding error of deeper coding units according to depths by using Rate-Distortion Optimization based on Lagrangian multipliers.

The output unit 130 outputs the image data of the maximum coding unit, which is encoded based on the at least one coded depth determined by the coding unit determiner 120, and information about the encoding mode according to the coded depth, in bitstreams.

The encoded image data may be obtained by encoding residual data of an image.

The information about the encoding mode according to coded depth may include information about the coded depth, about the partition type in the prediction unit, the prediction mode, and the size of the transform unit.

The information about the coded depth may be defined by using split information according to depths, which indicates whether encoding is performed on coding units of a lower depth instead of a current depth. If the current depth of the current coding unit is the coded depth, image data in the current coding unit is encoded and output, and thus the split information may be defined not to split the current coding unit to a lower depth. Alternatively, if the current depth of the current coding unit is not the coded depth, the encoding is performed on the coding unit of the lower depth, and thus the split information may be defined to split the current coding unit to obtain the coding units of the lower depth.

If the current depth is not the coded depth, encoding is performed on the coding unit that is split into the coding unit of the lower depth. Since at least one coding unit of the lower depth exists in one coding unit of the current depth, the encoding is repeatedly performed on each coding unit of the lower depth, and thus the encoding may be recursively performed for the coding units having the same depth.

Since the coding units having a tree structure are determined for one maximum coding unit, and information about at least one encoding mode is determined for a coding unit of a coded depth, information about at least one encoding mode may be determined for one maximum coding unit. Also, a coded depth of the image data of the maximum coding unit may be different according to locations since the image data is hierarchically split according to depths, and thus information about the coded depth and the encoding mode may be set for the image data.

Accordingly, the output unit 130 may assign encoding information about a corresponding coded depth and an encoding mode to at least one of the coding unit, the prediction unit, and a minimum unit included in the maximum coding unit.

The minimum unit according to an exemplary embodiment is a rectangular data unit obtained by splitting the minimum coding unit constituting the lowermost depth by 4. Alternatively, the minimum unit may be a maximum rectangular data unit that may be included in all of the coding units, prediction units, partition units, and transform units included in the maximum coding unit.

For example, the encoding information output through the output unit 130 may be classified into encoding information according to coding units, and encoding information according to prediction units. The encoding information according to the coding units may include the information about the prediction mode and about the size of the partitions. The encoding information according to the prediction units may include information about an estimated direction of an inter mode, about a reference image index of the inter mode, about a motion vector, about a chroma component of an intra mode, and about an interpolation method of the intra mode. Also, information about a maximum size of the coding unit defined according to pictures, slices, or GOPs, and information about a maximum depth may be inserted into SPS (Sequence Parameter Set) or a header of a bitstream.

In the video encoding apparatus 100, the deeper coding unit may be a coding unit obtained by dividing a height or width of a coding unit of an upper depth, which is one layer above, by two. In other words, when the size of the coding unit of the current depth is 2N×2N, the size of the coding unit of the lower depth is N×N. Also, the coding unit of the current depth having the size of 2N×2N may include maximum 4 of the coding unit of the lower depth.

Accordingly, the video encoding apparatus 100 may form the coding units having the tree structure by determining coding units having an optimum shape and an optimum size for each maximum coding unit, based on the size of the maximum coding unit and the maximum depth determined considering characteristics of the current picture. Also, since encoding may be performed on each maximum coding unit by using any one of various prediction modes and transformations, an optimum encoding mode may be determined considering characteristics of the coding unit of various image sizes.

Thus, if an image having high resolution or large data amount is encoded in a conventional macroblock, a number of macroblocks per picture excessively increases. Accordingly, a number of pieces of compressed information generated for each macroblock increases, and thus it is difficult to transmit the compressed information and data compression efficiency decreases. However, by using the video encoding apparatus 100, image compression efficiency may be increased since a coding unit is adjusted while considering characteristics of an image while increasing a maximum size of a coding unit while considering a size of the image.

Figure 2:
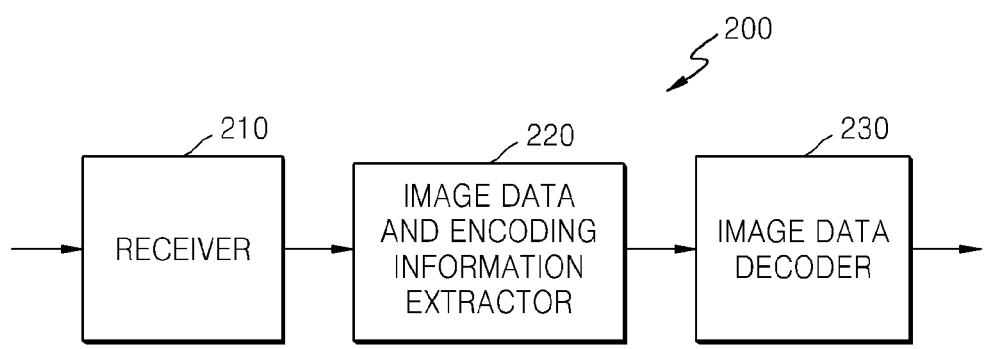
FIG. 2 is a block diagram of an apparatus for decoding a video, according to an exemplary embodiment.

FIG. 2 is a block diagram of a video decoding apparatus 200, according to an exemplary embodiment.

The video decoding apparatus 200 includes a receiver 210, an image data and encoding information extractor 220, and an image data decoder 230. Definitions of various terms, such as a coding unit, a depth, a prediction unit, a transform unit, and information about various encoding modes, for various operations of the video decoding apparatus 200 are identical to those described with reference to FIG. 1 and the video encoding apparatus 100.

The receiver 210 receives and parses a bitstream of an encoded video. The image data and encoding information extractor 220 extracts encoded image data for each coding unit from the parsed bitstream, wherein the coding units have a tree structure according to each maximum coding unit, and outputs the extracted image data to the image data decoder 230. The image data and encoding information extractor 220 may extract information about a maximum size of a coding unit of a current picture, from a header about the current picture or SPS.

Also, the image data and encoding information extractor 220 extracts information about a coded depth and an encoding mode for the coding units having a tree structure according to each maximum coding unit, from the parsed bitstream. The extracted information about the coded depth and the encoding mode is output to the image data decoder 230. In other words, the image data in a bit stream is split into the maximum coding unit so that the image data decoder 230 decodes the image data for each maximum coding unit.

The information about the coded depth and the encoding mode according to the maximum coding unit may be set for information about at least one coding unit corresponding to the coded depth, and information about an encoding mode may include information about a partition type of a corresponding coding unit corresponding to the coded depth, about a prediction mode, and a size of a transform unit. Also, splitting information according to depths may be extracted as the information about the coded depth.

The information about the coded depth and the encoding mode according to each maximum coding unit extracted by the image data and encoding information extractor 220 is information about a coded depth and an encoding mode determined to generate a minimum encoding error when an encoder, such as the video encoding apparatus 100, repeatedly performs encoding for each deeper coding unit according to depths according to each maximum coding unit. Accordingly, the video decoding apparatus 200 may restore an image by decoding the image data according to a coded depth and an encoding mode that generates the minimum encoding error.

Since encoding information about the coded depth and the encoding mode may be assigned to a predetermined data unit from among a corresponding coding unit, a prediction unit, and a minimum unit, the image data and encoding information extractor 220 may extract the information about the coded depth and the encoding mode according to the predetermined data units. The predetermined data units to which the same information about the coded depth and the encoding mode is assigned may be inferred to be the data units included in the same maximum coding unit.

The image data decoder 230 restores the current picture by decoding the image data in each maximum coding unit based on the information about the coded depth and the encoding mode according to the maximum coding units. In other words, the image data decoder 230 may decode the encoded image data based on the extracted information about the partition type, the prediction mode, and the transform unit for each coding unit from among the coding units having the tree structure included in each maximum coding unit. A decoding process may include a prediction including intra prediction and motion compensation, and an inverse transformation. Inverse transformation may be performed according to method of inverse orthogonal transformation or inverse integer transformation.

The image data decoder 230 may perform intra prediction or motion compensation according to a partition and a prediction mode of each coding unit, based on the information about the partition type and the prediction mode of the prediction unit of the coding unit according to coded depths.

Also, the image data decoder 230 may perform inverse transformation according to each transform unit in the coding unit, based on the information about the size of the transform unit of the coding unit according to coded depths, so as to perform the inverse transformation according to maximum coding units.

The image data decoder 230 may determine at least one coded depth of a current maximum coding unit by using split information according to depths. If the split information indicates that image data is no longer split in the current depth, the current depth is a coded depth. Accordingly, the image data decoder 230 may decode encoded data of at least one coding unit corresponding to the each coded depth in the current maximum coding unit by using the information about the partition type of the prediction unit, the prediction mode, and the size of the transform unit for each coding unit corresponding to the coded depth, and output the image data of the current maximum coding unit.

In other words, data units containing the encoding information including the same split information may be gathered by observing the encoding information set assigned for the predetermined data unit from among the coding unit, the prediction unit, and the minimum unit, and the gathered data units may be considered to be one data unit to be decoded by the image data decoder 230 in the same encoding mode.

The video decoding apparatus 200 may obtain information about at least one coding unit that generates the minimum encoding error when encoding is recursively performed for each maximum coding unit, and may use the information to decode the current picture. In other words, the coding units having the tree structure determined to be the optimum coding units in each maximum coding unit may be decoded. Also, the maximum size of coding unit is determined considering resolution and an amount of image data.

Accordingly, even if image data has high resolution and a large amount of data, the image data may be efficiently decoded and restored by using a size of a coding unit and an encoding mode, which are adaptively determined according to characteristics of the image data, by using information about an optimum encoding mode received from an encoder.

A method of determining coding units having a tree structure, a prediction unit, and a transform unit, according to an exemplary embodiment, will now be described with reference to FIGS. 3 through 13.

Figure 3:
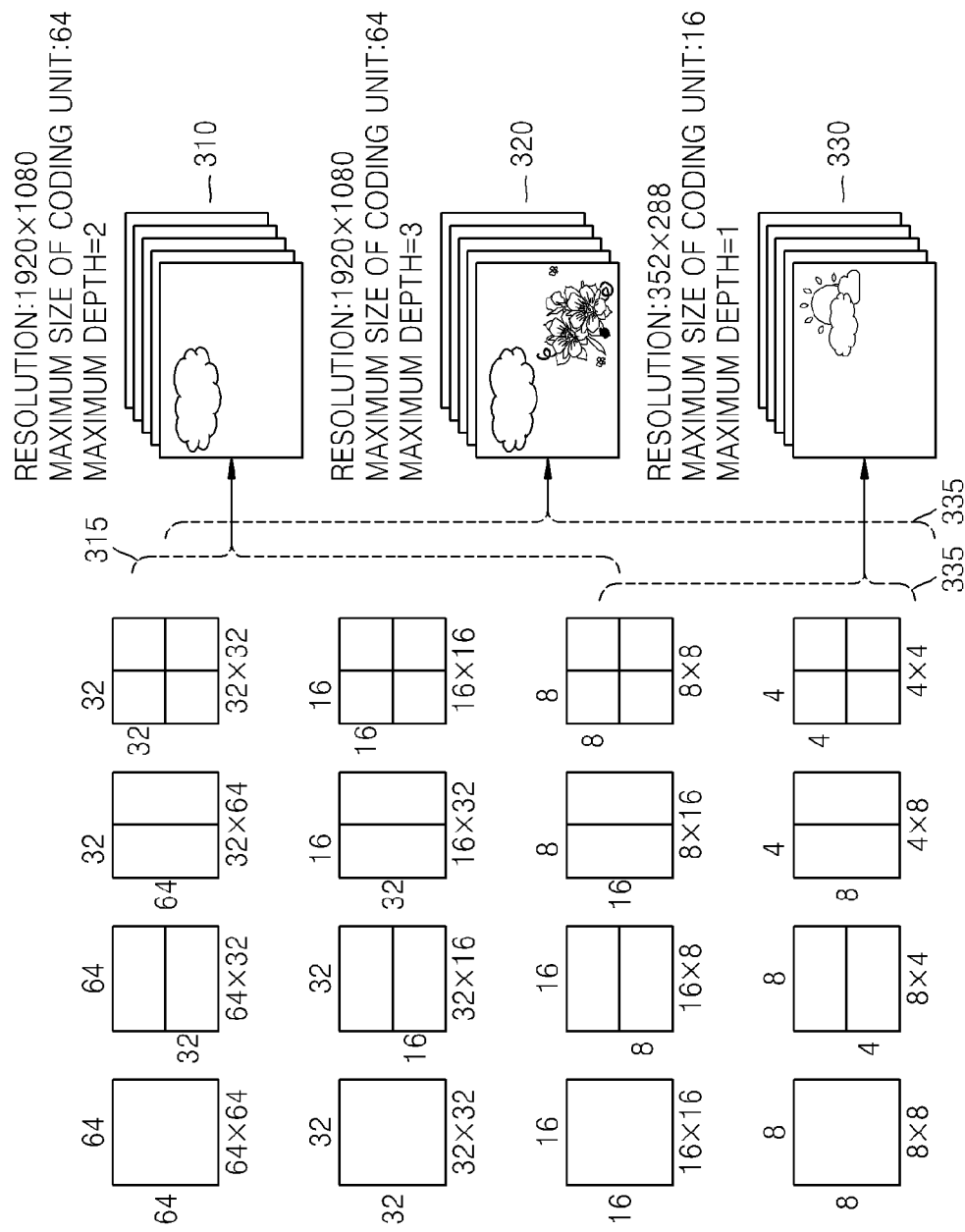
FIG. 3 is a diagram for describing a concept of coding units according to an exemplary embodiment.

FIG. 3 is a diagram for describing a concept of coding units according to an exemplary embodiment.

A size of a coding unit may be expressed in width×height, and may be 64×64, 32×32, 16×16, and 8×8. A coding unit of 64×64 may be split into partitions of 64×64, 64×32, 32×64, or 32×32, and a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 310, a resolution is 1920×1080, a maximum size of a coding unit is 64, and a maximum depth is 2. In video data 320, a resolution is 1920×1080, a maximum size of a coding unit is 64, and a maximum depth is 3. In video data 330, a resolution is 352×288, a maximum size of a coding unit is 16, and a maximum depth is 1. The maximum depth shown in FIG. 3 denotes a total number of splits from a maximum coding unit to a minimum decoding unit.

If a resolution is high or a data amount is large, a maximum size of a coding unit may be large so as to not only increase encoding efficiency but also to accurately reflect characteristics of an image. Accordingly, the maximum size of the coding unit of the video data 310 and 320 having the higher resolution than the video data 330 may be 64.

Since the maximum depth of the video data 310 is 2, coding units 315 of the video data 310 may include a maximum coding unit having a long axis size of 64, and coding units having long axis sizes of 32 and 16 since depths are deepened to two layers by splitting the maximum coding unit twice. Meanwhile, since the maximum depth of the video data 330 is 1, coding units 335 of the video data 330 may include a maximum coding unit having a long axis size of 16, and coding units having a long axis size of 8 since depths are deepened to one layer by splitting the maximum coding unit once.

Since the maximum depth of the video data 320 is 3, coding units 325 of the video data 320 may include a maximum coding unit having a long axis size of 64, and coding units having long axis sizes of 32, 16, and 8 since the depths are deepened to 3 layers by splitting the maximum coding unit three times. As a depth deepens, detailed information may be precisely expressed.

Figure 4:
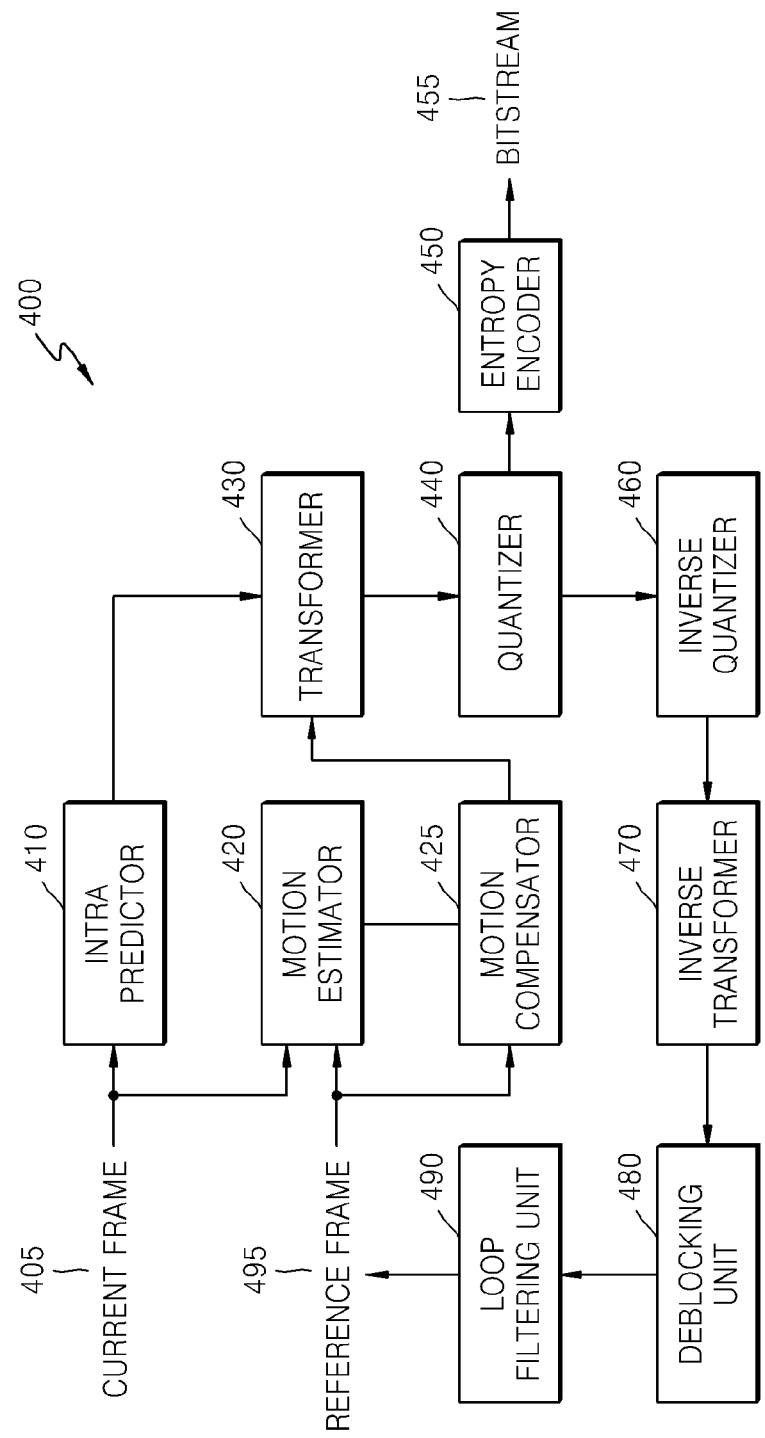
FIG. 4 is a block diagram of an image encoder based on coding units according to an exemplary embodiment.

FIG. 4 is a block diagram of an image encoder 400 based on coding units, according to an exemplary embodiment.

The image encoder 400 performs operations of the coding unit determiner 120 of the video encoding apparatus 100 to encode image data. In other words, an intra predictor 410 performs intra prediction on coding units in an intra mode, from among a current frame 405, and a motion estimator 420 and a motion compensator 425 performs inter estimation and motion compensation on coding units in an inter mode from among the current frame 405 by using the current frame 405, and a reference frame 495.

Data output from the intra predictor 410, the motion estimator 420, and the motion compensator 425 is output as a quantized transformation coefficient through a transformer 430 and a quantizer 440. The quantized transformation coefficient is restored as data in a spatial domain through an inverse quantizer 460 and an inverse transformer 470, and the restored data in the spatial domain is output as the reference frame 495 after being post-processed through a deblocking unit 480 and a loop filtering unit 490. The quantized transformation coefficient may be output as a bitstream 455 through an entropy encoder 450.

In order for the image encoder 400 to be applied in the video encoding apparatus 100, all elements of the image encoder 400, i.e., the intra predictor 410, the motion estimator 420, the motion compensator 425, the transformer 430, the quantizer 440, the entropy encoder 450, the inverse quantizer 460, the inverse transformer 470, the deblocking unit 480, and the loop filtering unit 490 perform operations based on each coding unit from among coding units having a tree structure while considering the maximum depth of each maximum coding unit.

Specifically, the intra predictor 410, the motion estimator 420, and the motion compensator 425 determines partitions and a prediction mode of each coding unit from among the coding units having a tree structure while considering the maximum size and the maximum depth of a current maximum coding unit, and the transformer 430 determines the size of the transform unit in each coding unit from among the coding units having a tree structure.

Figure 5:
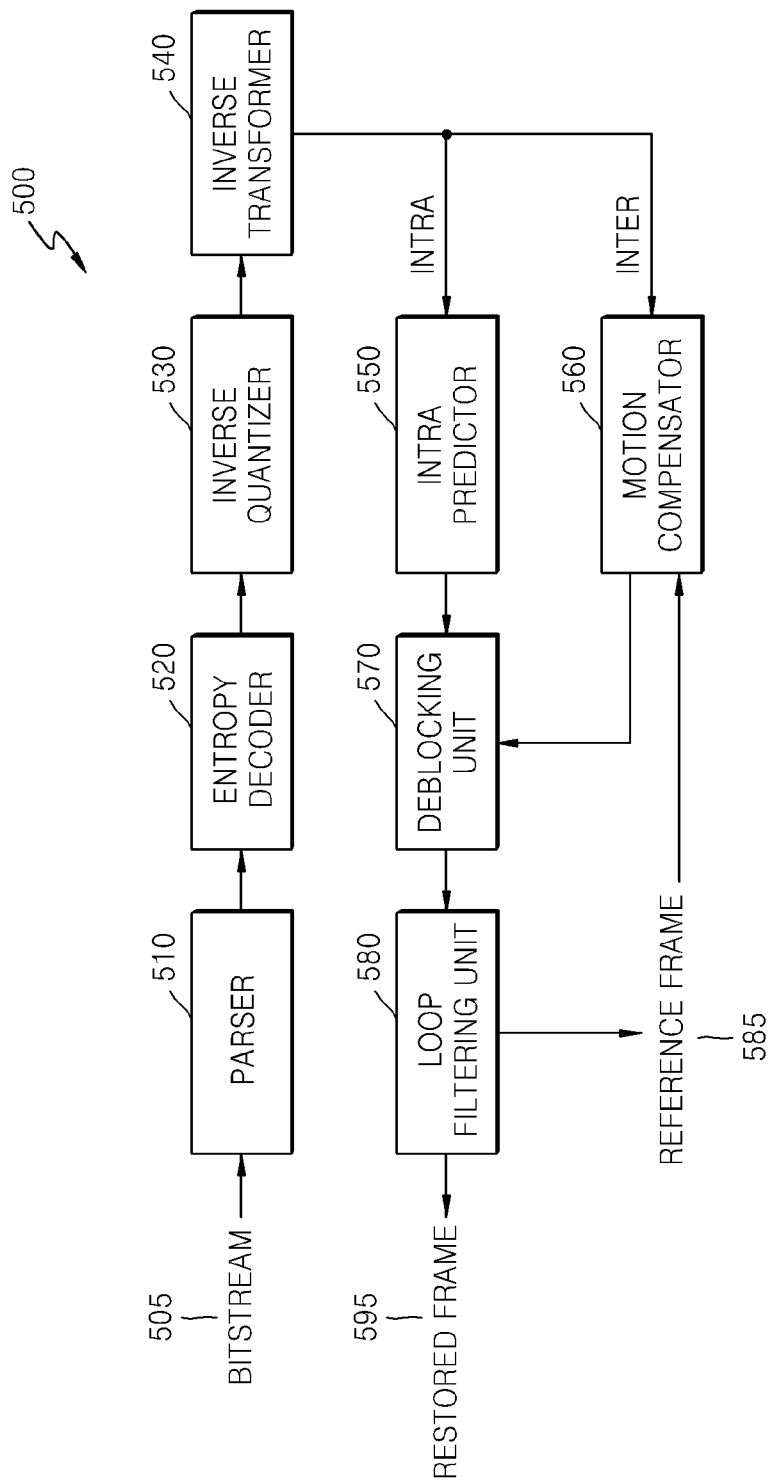
FIG. 5 is a block diagram of an image decoder based on coding units according to an exemplary embodiment.

FIG. 5 is a block diagram of an image decoder 500 based on coding units, according to an exemplary embodiment.

A parser 510 parses encoded image data to be decoded and information about encoding required for decoding from a bitstream 505. The encoded image data is output as inverse quantized data through an entropy decoder 520 and an inverse quantizer 530, and the inverse quantized data is restored to image data in a spatial domain through an inverse transformer 540.

An intra predictor 550 performs intra prediction on coding units in an intra mode with respect to the image data in the spatial domain, and a motion compensator 560 performs motion compensation on coding units in an inter mode by using a reference frame 585.

The image data in the spatial domain, which passed through the intra predictor 550 and the motion compensator 560, may be output as a restored frame 595 after being post-processed through a deblocking unit 570 and a loop filtering unit 580. Also, the image data that is post-processed through the deblocking unit 570 and the loop filtering unit 580 may be output as the reference frame 585.

In order to decode the image data in the image data decoder 230 of the video decoding apparatus 200, the image decoder 500 may perform operations that are performed after the parser 510.

In order for the image decoder 500 to be applied in the video decoding apparatus 200, all elements of the image decoder 500, i.e., the parser 510, the entropy decoder 520, the inverse quantizer 530, the inverse transformer 540, the intra predictor 550, the motion compensator 560, the deblocking unit 570, and the loop filtering unit 580 perform operations based on coding units having a tree structure for each maximum coding unit.

Specifically, the intra prediction 550 and the motion compensator 560 perform operations based on partitions and a prediction mode for each of the coding units having a tree structure, and the inverse transformer 540 perform operations based on a size of a transform unit for each coding unit.

Figure 6:
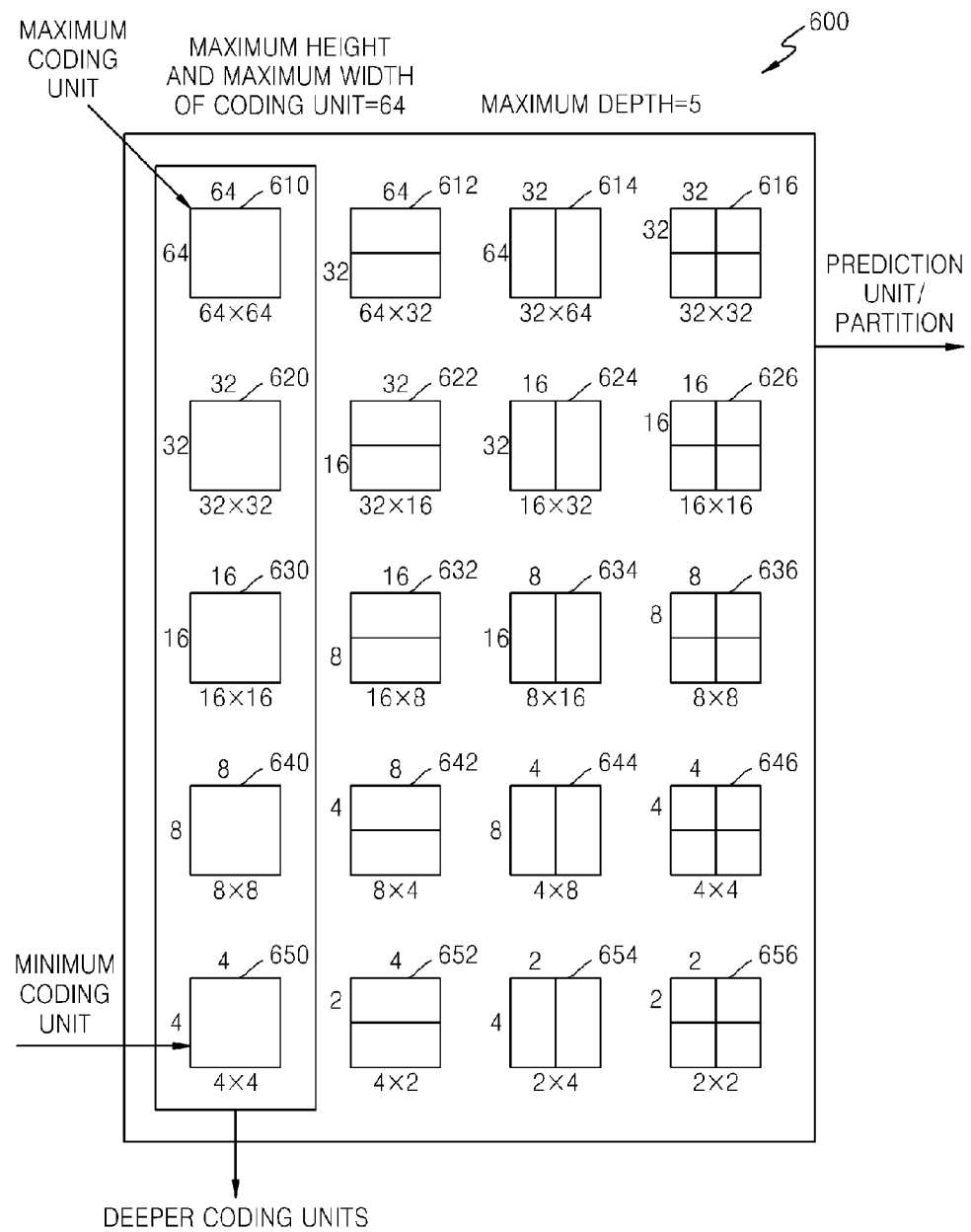
FIG. 6 is a diagram illustrating deeper coding units according to depths, and partitions according to an exemplary embodiment

FIG. 6 is a diagram illustrating deeper coding units according to depths, and partitions, according to an exemplary embodiment.

The video encoding apparatus 100 and the video decoding apparatus 200 use hierarchical coding units so as to consider characteristics of an image. A maximum height, a maximum width, and a maximum depth of coding units may be adaptively determined according to the characteristics of the image, or may be differently set by a user. Sizes of deeper coding units according to depths may be determined according to the predetermined maximum size of the coding unit.

In a hierarchical structure 600 of coding units, according to an exemplary embodiment, the maximum height and the maximum width of the coding units are each 64, and the maximum depth is 4. Since a depth deepens along a vertical axis of the hierarchical structure 600, a height and a width of the deeper coding unit are each split. Also, a prediction unit and partitions, which are bases for prediction encoding of each deeper coding unit, are shown along a horizontal axis of the hierarchical structure 600.

In other words, a coding unit 610 is a maximum coding unit in the hierarchical structure 600, wherein a depth is 0 and a size, i.e., a height by width, is 64×64. The depth deepens along the vertical axis, and a coding unit 620 having a size of 32×32 and a depth of 1, a coding unit 630 having a size of 16×16 and a depth of 2, a coding unit 640 having a size of 8×8 and a depth of 3, and a coding unit 650 having a size of 4×4 and a depth of 4 exist. The coding unit 650 having the size of 4×4 and the depth of 4 is a minimum coding unit.

The prediction unit and the partitions of a coding unit are arranged along the horizontal axis according to each depth. In other words, if the coding unit 610 having the size of 64×64 and the depth of 0 is a prediction unit, the prediction unit may be split into partitions include in the encoding unit 610, i.e. a partition 610 having a size of 64×64, partitions 612 having the size of 64×32, partitions 614 having the size of 32×64, or partitions 616 having the size of 32×32.

Similarly, a prediction unit of the coding unit 620 having the size of 32×32 and the depth of 1 may be split into partitions included in the coding unit 620, i.e. a partition 620 having a size of 32×32, partitions 622 having a size of 32×16, partitions 624 having a size of 16×32, and partitions 626 having a size of 16×16.

Similarly, a prediction unit of the coding unit 630 having the size of 16×16 and the depth of 2 may be split into partitions included in the coding unit 630, i.e. a partition having a size of 16×16 included in the coding unit 630, partitions 632 having a size of 16×8, partitions 634 having a size of 8×16, and partitions 636 having a size of 8×8.

Similarly, a prediction unit of the coding unit 640 having the size of 8×8 and the depth of 3 may be split into partitions included in the coding unit 640, i.e. a partition having a size of 8×8 included in the coding unit 640, partitions 642 having a size of 8×4, partitions 644 having a size of 4×8, and partitions 646 having a size of 4×4.

The coding unit 650 having the size of 4×4 and the depth of 4 is the minimum coding unit and a coding unit of the lowermost depth. A prediction unit of the coding unit 650 is only assigned to a partition having a size of 4×4.

In order to determine the at least one coded depth of the coding units constituting the maximum coding unit 610, the coding unit determiner 120 of the video encoding apparatus 100 performs encoding for coding units corresponding to each depth included in the maximum coding unit 610.

A number of deeper coding units according to depths including data in the same range and the same size increases as the depth deepens. For example, four coding units corresponding to a depth of 2 are required to cover data that is included in one coding unit corresponding to a depth of 1. Accordingly, in order to compare encoding results of the same data according to depths, the coding unit corresponding to the depth of 1 and four coding units corresponding to the depth of 2 are each encoded.

In order to perform encoding for a current depth from among the depths, a least encoding error may be selected for the current depth by performing encoding for each prediction unit in the coding units corresponding to the current depth, along the horizontal axis of the hierarchical structure 600. Alternatively, the minimum encoding error may be searched for by comparing the least encoding errors according to depths, by performing encoding for each depth as the depth deepens along the vertical axis of the hierarchical structure 600. A depth and a partition having the minimum encoding error in the coding unit 610 may be selected as the coded depth and a partition type of the coding unit 610.

Figure 7:
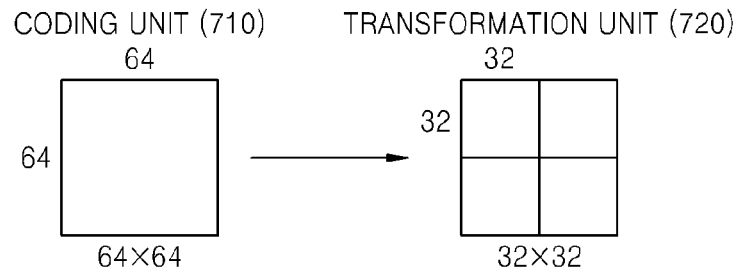
FIG. 7 is a diagram for describing a relationship between a coding unit and transform units, according to an exemplary embodiment.

FIG. 7 is a diagram for describing a relationship between a coding unit 710 and transform units 720, according to an exemplary embodiment.

The video encoding apparatus 100 or 200 encodes or decodes an image according to coding units having sizes smaller than or equal to a maximum coding unit for each maximum coding unit. Sizes of transform units for transformation during encoding may be selected based on data units that are not larger than a corresponding coding unit.

For example, in the video encoding apparatus 100 or 200, if a size of the coding unit 710 is 64×64, transformation may be performed by using the transform units 720 having a size of 32×32.

Also, data of the coding unit 710 having the size of 64×64 may be encoded by performing the transformation on each of the transform units having the size of 32×32, 16×16, 8×8, and 4×4, which are smaller than 64×64, and then a transform unit having the least coding error may be selected.

Figure 8:
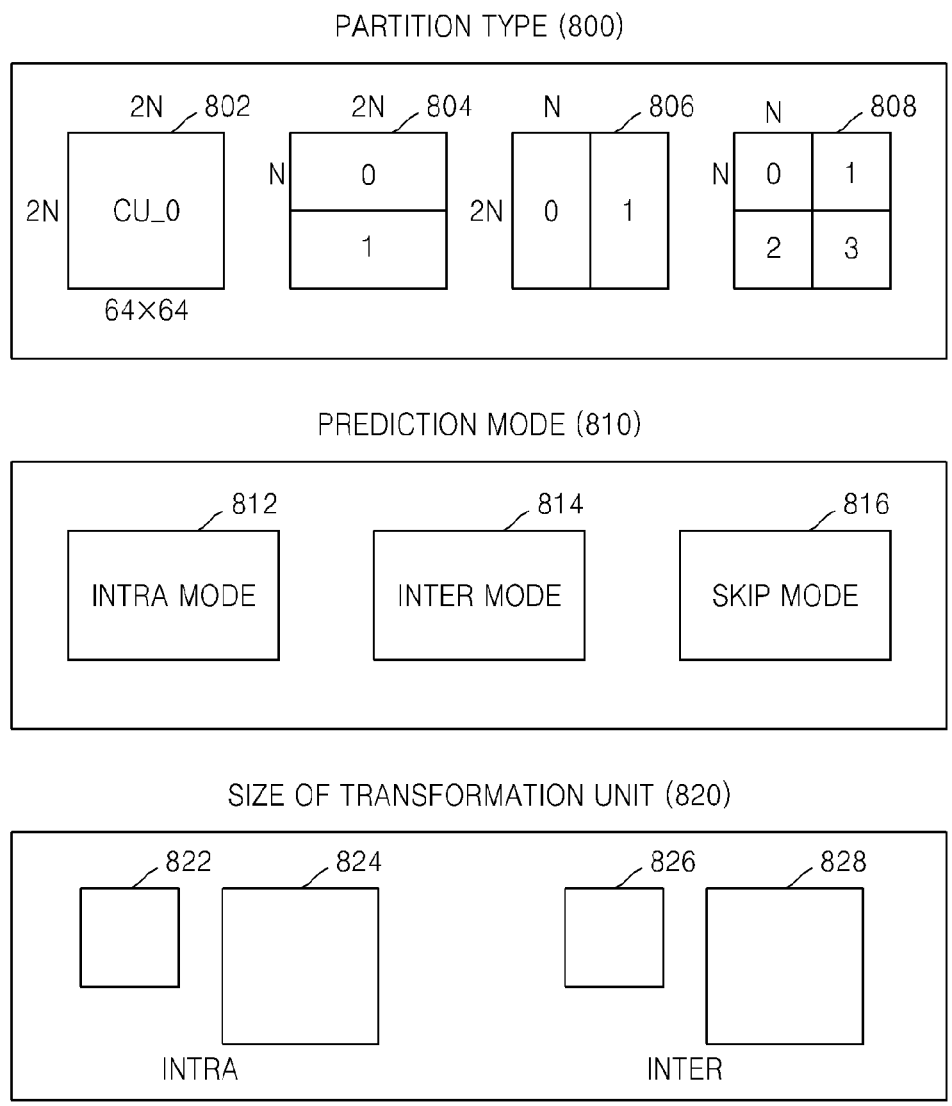
FIG. 8 is a diagram for describing encoding information of coding units corresponding to a coded depth, according to an exemplary embodiment.

FIG. 8 is a diagram for describing encoding information of coding units corresponding to a coded depth, according to an exemplary embodiment.

The output unit 130 of the video encoding apparatus 100 may encode and transmit information 800 about a partition type, information 810 about a prediction mode, and information 820 about a size of a transform unit for each coding unit corresponding to a coded depth, as information about an encoding mode.

The information 800 indicates information about a shape of a partition obtained by splitting a prediction unit of a current coding unit, wherein the partition is a data unit for prediction encoding the current coding unit. For example, a current coding unit CU_0 having a size of 2N×2N may be split into any one of a partition 802 having a size of 2N×2N, a partition 804 having a size of 2N×N, a partition 806 having a size of N×2N, and a partition 808 having a size of N×N. Here, the information 800 about a partition type is set to indicate one of the partition 804 having a size of 2N×N, the partition 806 having a size of N×2N, and the partition 808 having a size of N×N The information 810 indicates a prediction mode of each partition. For example, the information 810 may indicate a mode of prediction encoding performed on a partition indicated by the information 800, i.e., an intra mode 812, an inter mode 814, or a skip mode 816.

The information 820 indicates a transform unit to be based on when transformation is performed on a current coding unit. For example, the transform unit may be a first intra transform unit 822, a second intra transform unit 824, a first inter transform unit 826, or a second intra transform unit 828.

Figure 9:
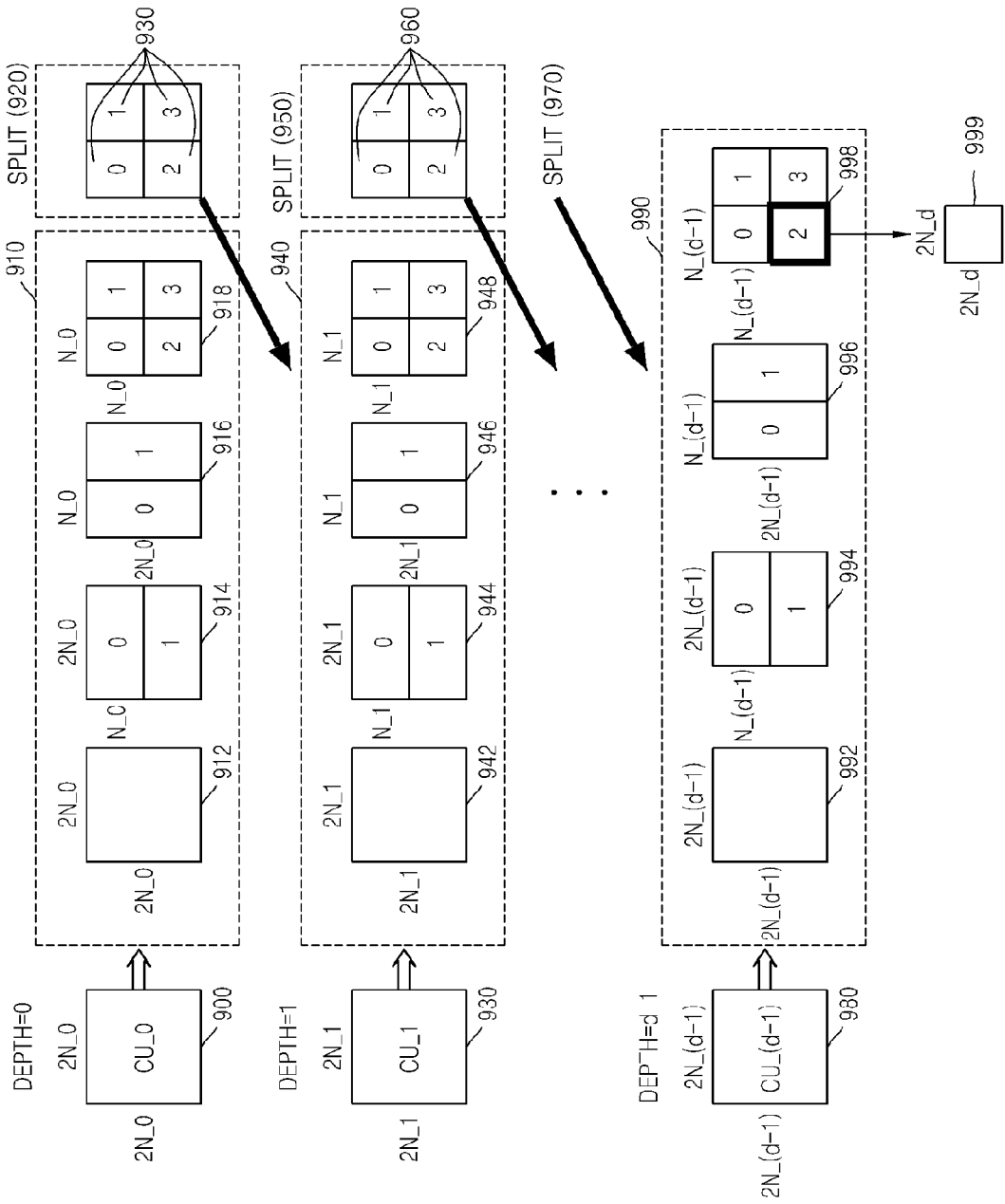
FIG. 9 is a diagram of deeper coding units according to depths, according to an exemplary embodiment.

The image data and encoding information extractor 220 of the video decoding apparatus 200 may extract and use the information 800, 810, and 820 for decoding, according to each deeper coding unit FIG. 9 is a diagram of deeper coding units according to depths, according to an exemplary embodiment.

Split information may be used to indicate a change of a depth. The spilt information indicates whether a coding unit of a current depth is split into coding units of a lower depth.

A prediction unit 910 for prediction encoding a coding unit 900 having a depth of 0 and a size of 2N_0×2N_0 may include partitions of a partition type 912 having a size of 2N_0×2N_0, a partition type 914 having a size of 2N_0× N_0, a partition type 916 having a size of N_0×2N_0, and a partition type 918 having a size of N_0×N_0. FIG. 9 only illustrates the partition types 912 through 918 which are obtained by symmetrically splitting the prediction unit 910, but a partition type is not limited thereto, and the partitions of the prediction unit 910 may include asymmetrical partitions, partitions having a predetermined shape, and partitions having a geometrical shape.

Prediction encoding is repeatedly performed on one partition having a size of 2N_0×2N_0, two partitions having a size of 2N_0×N_0, two partitions having a size of N_0× 2N_0, and four partitions having a size of N_0×N_0, according to each partition type. The prediction encoding in an intra mode and an inter mode may be performed on the partitions having the sizes of 2N_0×2N_0, N_0×2N_0, 2N_0×N_0, and N_0×N_0. The prediction encoding in a skip mode is performed only on the partition having the size of 2N_0×2N_0.

Errors of encoding including the prediction encoding in the partition types 912 through 918 are compared, and the least encoding error is determined among the partition types. If an encoding error is smallest in one of the partition types 912 through 916, the prediction unit 910 may not be split into a lower depth.

If the encoding error is the smallest in the partition type 918, a depth is changed from 0 to 1 to split the partition type 918 in operation 920, and encoding is repeatedly performed on coding units 930 having a depth of 2 and a size of N_0× N_0 to search for a minimum encoding error.

A prediction unit 940 for prediction encoding the coding unit 930 having a depth of 1 and a size of 2N_1×2N_1 (=N_0×N_0) may include partitions of a partition type 942 having a size of 2N_1×2N_1, a partition type 944 having a size of 2N_1×N_1, a partition type 946 having a size of N_1×2N_1, and a partition type 948 having a size of N_1× N_1.

If an encoding error is the smallest in the partition type 948, a depth is changed from 1 to 2 to split the partition type 948 in operation 950, and encoding is repeatedly performed on coding units 960, which have a depth of 2 and a size of N_2× N_2 to search for a minimum encoding error.

When a maximum depth is d, split operation according to each depth may be performed up to when a depth becomes d−1, and split information may be encoded as up to when a depth is one of 0 to d−2. In other words, when encoding is performed up to when the depth is d−1 after a coding unit corresponding to a depth of d−2 is split in operation 970, a prediction unit 990 for prediction encoding a coding unit 980 having a depth of d−1 and a size of 2N_(d−1)×2N_(d−1) may include partitions of a partition type 992 having a size of 2N_(d−1)×2N_(d−1), a partition type 994 having a size of 2N_(d−1)×N_(d−1), a partition type 996 having a size of N_(d−1)×2N_(d−1), and a partition type 998 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), four partitions having a size of N_(d−1)×N_(d−1) from among the partition types 992 through 998 to search for a partition type having a minimum encoding error.

Even when the partition type 998 has the minimum encoding error, since a maximum depth is d, a coding unit CU_(d−1) having a depth of d−1 is no longer split to a lower depth, and a coded depth for the coding units constituting a current maximum coding unit 900 is determined to be d−1 and a partition type of the current maximum coding unit 900 may be determined to be N_(d−1)×N_(d−1). Also, since the maximum depth is d and a minimum coding unit 980 having a lowermost depth of d−1 is no longer split to a lower depth, split information for the minimum coding unit 980 is not set.

A data unit 999 may be a 'minimum unit' for the current maximum coding unit. A minimum unit according to an exemplary embodiment may be a rectangular data unit obtained by splitting a minimum coding unit 980 by 4. By performing the encoding repeatedly, the video encoding apparatus 100 may select a depth having the least encoding error by comparing encoding errors according to depths of the coding unit 900 to determine a coded depth, and set a corresponding partition type and a prediction mode as an encoding mode of the coded depth.

As such, the minimum encoding errors according to depths are compared in all of the depths of 1 through d, and a depth having the least encoding error may be determined as a coded depth. The coded depth, the partition type of the prediction unit, and the prediction mode may be encoded and transmitted as information about an encoding mode. Also, since a coding unit is split from a depth of 0 to a coded depth, only split information of the coded depth is set to 0, and split information of depths excluding the coded depth is set to 1.

The image data and encoding information extractor 220 of the video decoding apparatus 200 may extract and use the information about the coded depth and the prediction unit of the coding unit 900 to decode the partition 912. The video decoding apparatus 200 may determine a depth, in which split information is 0, as a coded depth by using split information according to depths, and use information about an encoding mode of the corresponding depth for decoding.

Figure 10:
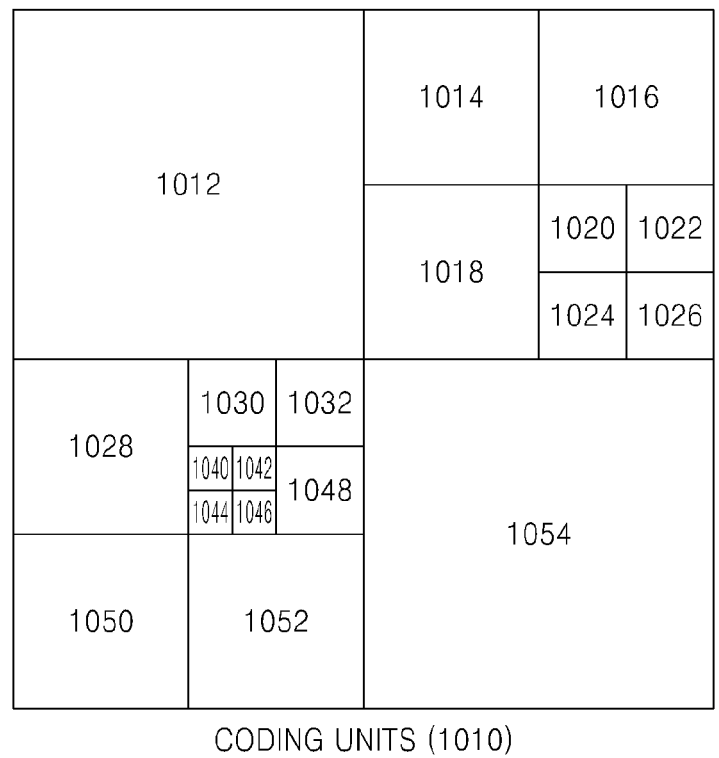
FIGS. 10 through 12 are diagrams for describing a relationship between coding units, prediction units, and transform units, according to an exemplary embodiment.
Figure 11:
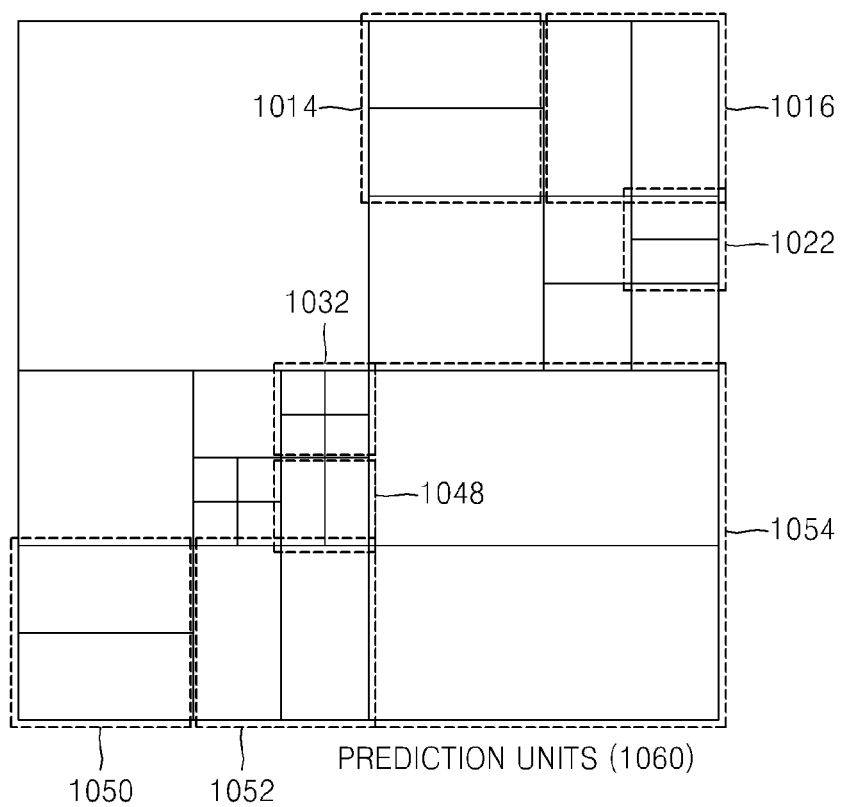
Figure 12:
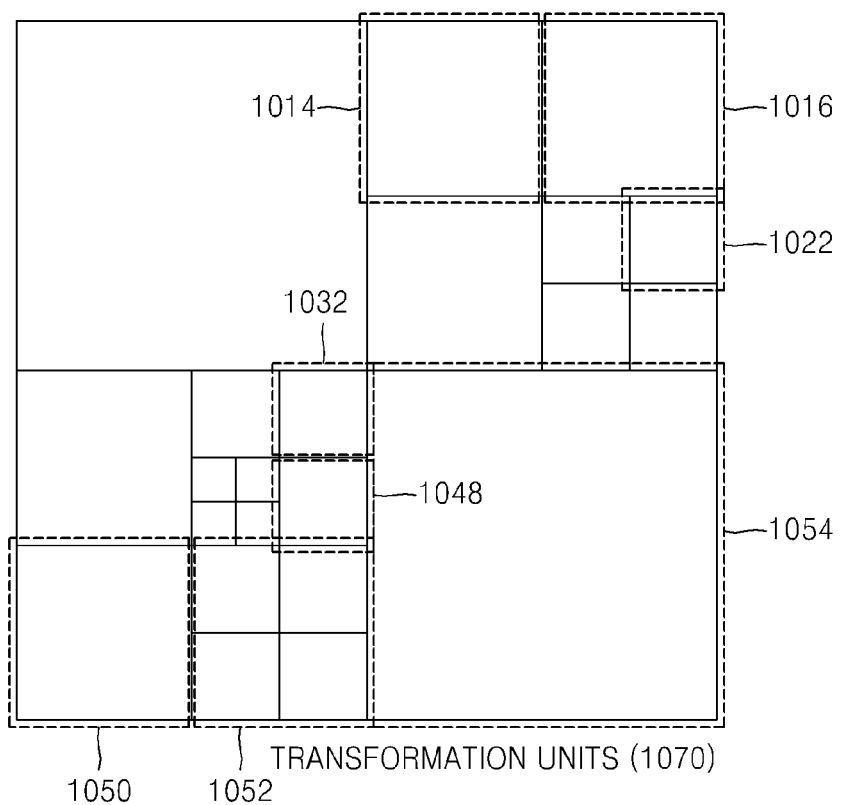

FIGS. 10 through 12 are diagrams for describing a relationship between coding units 1010, prediction units 1060, and transform units 1070, according to an exemplary embodiment.

The coding units 1010 are coding units having a tree structure, corresponding to coded depths determined by the video encoding apparatus 100, in a maximum coding unit. The prediction units 1060 are partitions of prediction units of each of the coding units 1010, and the transform units 1070 are transform units of each of the coding units 1010.

When a depth of a maximum coding unit is 0 in the coding units 1010, depths of coding units 1012 and 1054 are 1, depths of coding units 1014, 1016, 1018, 1028, 1050, and 1052 are 2, depths of coding units 1020, 1022, 1024, 1026, 1030, 1032, and 1048 are 3, and depths of coding units 1040, 1042, 1044, and 1046 are 4.

In the prediction units 1060, some encoding units 1014, 1016, 1022, 1032, 1048, 1050, 1052, and 1054 are obtained by splitting the coding units in the encoding units 1010. In other words, partition types in the coding units 1014, 1022, 1050, and 1054 have a size of 2N×N, partition types in the coding units 1016, 1048, and 1052 have a size of N×2N, and a partition type of the coding unit 1032 has a size of N×N. Prediction units and partitions of the coding units 1010 are smaller than or equal to each coding unit.

Transformation or inverse transformation is performed on image data of the coding unit 1052 in the transform units 1070 in a data unit that is smaller than the coding unit 1052. Also, the coding units 1014, 1016, 1022, 1032, 1048, 1050, and 1052 in the transform units 1070 are different from those in the prediction units 1060 in terms of sizes and shapes. In other words, the video encoding and decoding apparatuses 100 and 200 may perform intra prediction, motion estimation, motion compensation, transformation, and inverse transformation individually on a data unit in the same coding unit.

Accordingly, encoding is recursively performed on each of coding units having a hierarchical structure in each region of a maximum coding unit to determine an optimum coding unit, and thus coding units having a recursive tree structure may be obtained. Encoding information may include split information about a coding unit, information about a partition type, information about a prediction mode, and information about a size of a transform unit. Table 1 shows the encoding information that may be set by the video encoding and decoding apparatuses 100 and 200.

TABLE 1

Split Information 0
(Encoding on Coding Unit having Size of 2N × 2N and Current Depth of d)

| Prediction Mode | Partition Type | | Size of Transform unit | | Split Information 1 |
|---|---|---|---|---|---|
| | Symmetrical Partition Type | Asymmetrical Partition Type | Split Information 0 of Transform unit | Split Information 1 of Transform unit | |
| Intra Inter Skip (Only 2N × 2N) | 2N × 2N 2N × N N × 2N N × N | 2N × nU 2N × nD nL × 2N nR × 2N | 2N × 2N | N × N (Symmetrical Type) N/2 × N/2 (Asymmetrical Type) | Repeatedly Encode Coding Units having Lower Depth of d + 1 |

The output unit 130 of the video encoding apparatus 100 may output the encoding information about the coding units having a tree structure, and the image data and encoding information extractor 220 of the video decoding apparatus 200 may extract the encoding information about the coding units having a tree structure from a received bitstream.

Split information indicates whether a current coding unit is split into coding units of a lower depth. If split information of a current depth d is 0, a depth, in which a current coding unit is no longer split into a lower depth, is a coded depth, and thus information about a partition type, prediction mode, and a size of a transform unit may be defined for the coded depth. If the current coding unit is further split according to the split information, encoding is independently performed on four split coding units of a lower depth.

A prediction mode may be one of an intra mode, an inter mode, and a skip mode. The intra mode and the inter mode may be defined in all partition types, and the skip mode is defined only in a partition type having a size of 2N×2N.

The information about the partition type may indicate symmetrical partition types having sizes of 2N×2N, 2N×N, N×2N, and N×N, which are obtained by symmetrically splitting a height or a width of a prediction unit, and asymmetrical partition types having sizes of 2N×nU, 2N×nD, nL×2N, and nR×2N, which are obtained by asymmetrically splitting the height or width of the prediction unit. The asymmetrical partition types having the sizes of 2N×nU and 2N×nD may be respectively obtained by splitting the height of the prediction unit in 1:3 and 3:1, and the asymmetrical partition types having the sizes of nL×2N and nR×2N may be respectively obtained by splitting the width of the prediction unit in 1:3 and 3:1

The size of the transform unit may be set to be two types in the intra mode and two types in the inter mode. In other words, if split information of the transform unit is 0, the size of the transform unit may be 2N×2N, which is the size of the current coding unit. If split information of the transform unit is 1, the transform units may be obtained by splitting the current coding unit. Also, if a partition type of the current coding unit having the size of 2N×2N is a symmetrical partition type, a size of a transform unit may be N×N, and if the partition type of the current coding unit is an asymmetrical partition type, the size of the transform unit may be N/2×N/2.

The encoding information about coding units having a tree structure may include at least one of a coding unit corresponding to a coded depth, a prediction unit, and a minimum unit. The coding unit corresponding to the coded depth may include at least one of a prediction unit and a minimum unit containing the same encoding information.

Accordingly, it is determined whether adjacent data units are included in the same coding unit corresponding to the coded depth by comparing encoding information of the adjacent data units. Also, a corresponding coding unit corresponding to a coded depth is determined by using encoding information of a data unit, and thus a distribution of coded depths in a maximum coding unit may be determined.

Accordingly, if a current coding unit is predicted based on encoding information of adjacent data units, encoding information of data units in deeper coding units adjacent to the current coding unit may be directly referred to and used.

Alternatively, if a current coding unit is predicted based on encoding information of adjacent data units, data units adjacent to the current coding unit are searched using encoding information of the data units, and the searched adjacent coding units may be referred for predicting the current coding unit.

Figure 13:
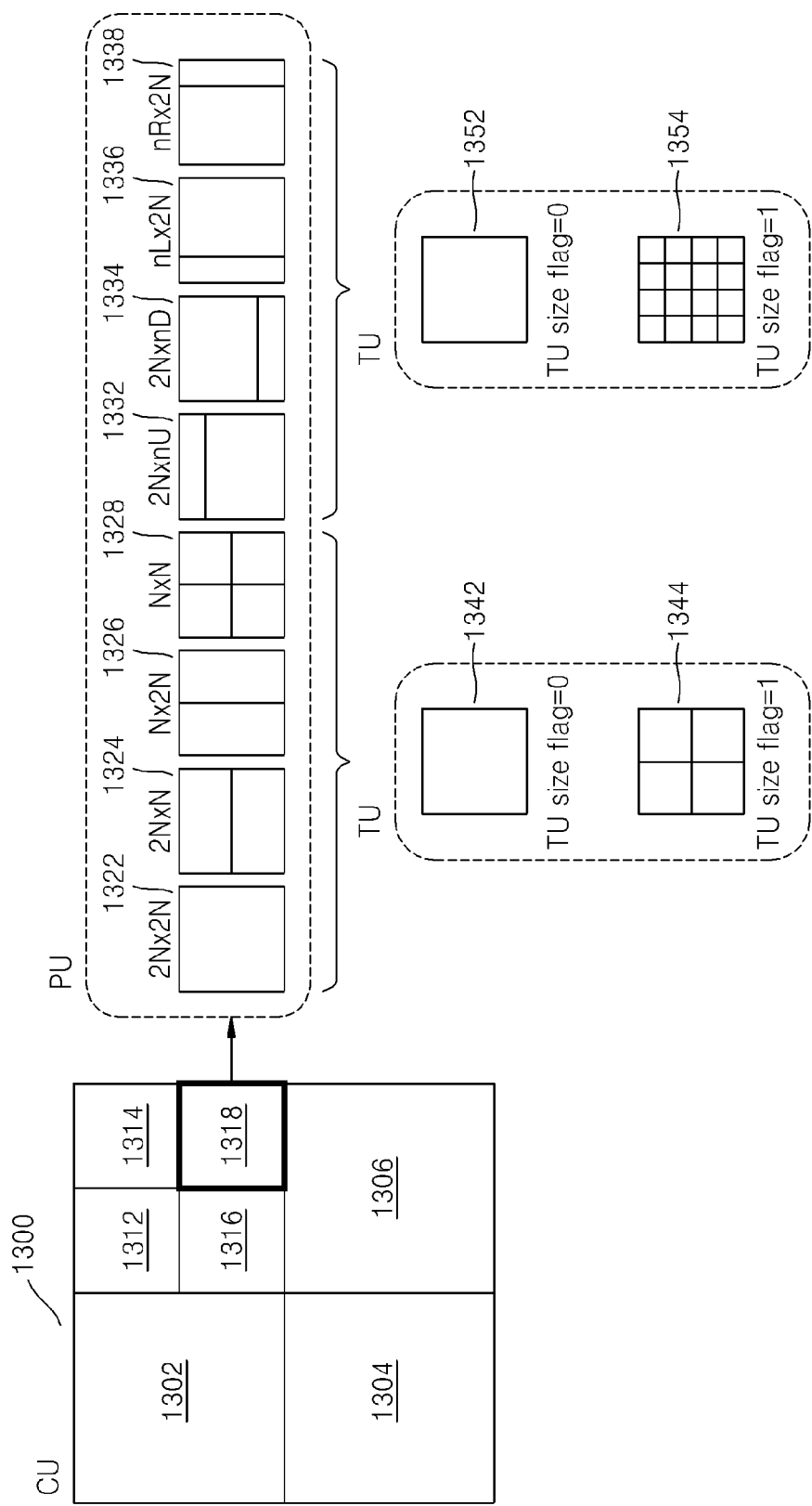
FIG. 13 is a diagram for describing a relationship between a coding unit, a prediction unit or a partition, and a transform unit, according to encoding mode information of Table 1.

FIG. 13 is a diagram for describing a relationship between a coding unit, a prediction unit or a partition, and a transform unit, according to encoding mode information of Table 1.

A maximum coding unit 1300 includes coding units 1302, 1304, 1306, 1312, 1314, 1316, and 1318 of coded depths. Here, since the coding unit 1318 is a coding unit of a coded depth, split information may be set to 0. Information about a partition type of the coding unit 1318 having a size of 2N×2N may be set to be one of a partition type 1322 having a size of 2N×2N, a partition type 1324 having a size of 2N×N, a partition type 1326 having a size of N×2N, a partition type 1328 having a size of N×N, a partition type 1332 having a size of 2N×nU, a partition type 1334 having a size of 2N×nD, a partition type 1336 having a size of nL×2N, and a partition type 1338 having a size of nR×2N.

When the partition type is set to be symmetrical, i.e., the partition type 1322, 1324, 1326, or 1328, a transform unit 1342 having a size of 2N×2N is set if split information (TU size flag) of a transform unit is 0, and a transform unit 1344 having a size of N×N is set if a TU size flag is 1.

When the partition type is set to be asymmetrical, i.e., the partition type 1332, 1334, 1336, or 1338, a transform unit 1352 having a size of 2N×2N is set if a TU size flag is 0, and a transform unit 1354 having a size of N/2×N/2 is set if a TU size flag is 1.

Referring to FIG. 13, the TU size flag is a flag having a value or 0 or 1, but the TU size flag is not limited to 1 bit, and a transform unit may be hierarchically split having a tree structure while the TU size flag increases from 0.

In this case, the size of a transform unit that has been actually used may be expressed by using a TU size flag of a transform unit, according to an exemplary embodiment, together with a maximum size and minimum size of the transform unit. According to an exemplary embodiment, the video encoding apparatus 100 is capable of encoding maximum transform unit size information, minimum transform unit size information, and a maximum TU size flag. The result of encoding the maximum transform unit size information, the minimum transform unit size information, and the maximum TU size flag may be inserted into an SPS. According to an exemplary embodiment, the video decoding apparatus 200 may decode video by using the maximum transform unit size information, the minimum transform unit size information, and the maximum TU size flag.

For example, if the size of a current coding unit is 64×64 and a maximum transform unit size is 32×32, then the size of a transform unit may be 32×32 when a TU size flag is 0, may be 16×16 when the TU size flag is 1, and may be 8×8 when the TU size flag is 2.

As another example, if the size of the current coding unit is 32×32 and a minimum transform unit size is 32×32, then the size of the transform unit may be 32×32 when the TU size flag is 0. Here, the TU size flag cannot be set to a value other than 0, since the size of the transform unit cannot be less than 32×32.

As another example, if the size of the current coding unit is 64×64 and a maximum TU size flag is 1, then the TU size flag may be 0 or 1. Here, the TU size flag cannot be set to a value other than 0 or 1.

Thus, if it is defined that the maximum TU size flag is 'MaxTransformSizeIndex', a minimum transform unit size is 'MinTransformSize', and a transform unit size is 'RootTuSize' when the TU size flag is 0, then a current minimum transform unit size 'CurrMinTuSize' that can be determined in a current coding unit, may be defined by Equation (1):

$$\text{CurrMinTuSize}=\max(\text{MinTransformSize},\text{RootTuSize}/(2^{\wedge}\text{MaxTransformSizeIndex})) \quad (1)$$

Compared to the current minimum transform unit size 'CurrMinTuSize' that can be determined in the current coding unit, a transform unit size 'RootTuSize' when the TU size flag is 0 may denote a maximum transform unit size that can be selected in the system. In Equation (1), 'RootTuSize/(2^MaxTransformSizeIndex)' denotes a transform unit size when the transform unit size 'RootTuSize', when the TU size flag is 0, is split a number of times corresponding to the maximum TU size flag, and 'MinTransformSize' denotes a minimum transformation size. Thus, a smaller value from among 'RootTuSize/(2^MaxTransformSizeIndex)' and 'MinTransform- Size' may be the current minimum transform unit size 'CurrMinTuSize' that can be determined in the current coding unit.

According to an exemplary embodiment, the maximum transform unit size RootTuSize may vary according to the type of a prediction mode.

For example, if a current prediction mode is an inter mode, then 'RootTuSize' may be determined by using Equation (2) below. In Equation (2), 'MaxTransformSize' denotes a maximum transform unit size, and 'PUSize' denotes a current prediction unit size.

$$RootTuSize=\min(MaxTransformSize, PUSize) \quad (2)$$

That is, if the current prediction mode is the inter mode, the transform unit size 'RootTuSize' when the TU size flag is 0, may be a smaller value from among the maximum transform unit size and the current prediction unit size.

If a prediction mode of a current partition unit is an intra mode, 'RootTuSize' may be determined by using Equation (3) below. In Equation (3), 'PartitionSize' denotes the size of the current partition unit.

$$RootTuSize=\min(MaxTransformSize, PartitionSize) \quad (3)$$

That is, if the current prediction mode is the intra mode, the transform unit size 'RootTuSize' when the TU size flag is 0 may be a smaller value from among the maximum transform unit size and the size of the current partition unit.

However, the current maximum transform unit size 'RootTuSize' that varies according to the type of a prediction mode in a partition unit is just an example and is not limited thereto.

Intra prediction performed by the intra prediction unit 410 of the video encoding apparatus 100 illustrated in FIG. 4 and the intra prediction unit 550 of the video decoding apparatus 200 illustrated in FIG. 5 will now be described in detail. In the following description, an encoding unit denotes a current encoded block in an encoding process of an image, and a decoding unit denotes a current decoded block in a decoding process of an image. The encoding unit and the decoding unit are different only in that the encoding unit is used in the encoding process and the decoding unit is used in the decoding. For the consistency of terms, except for a particular case, the encoding unit and the decoding unit are referred to as a coding unit in both the encoding and decoding processes. Also, the coding unit may be prediction unit, prediction partition and block. Also, one of ordinary skill in the art would understand by the present specification that an intra prediction method and apparatus according to an exemplary embodiment may also be applied to perform intra prediction in a general video codec.

Figures 14, 15:
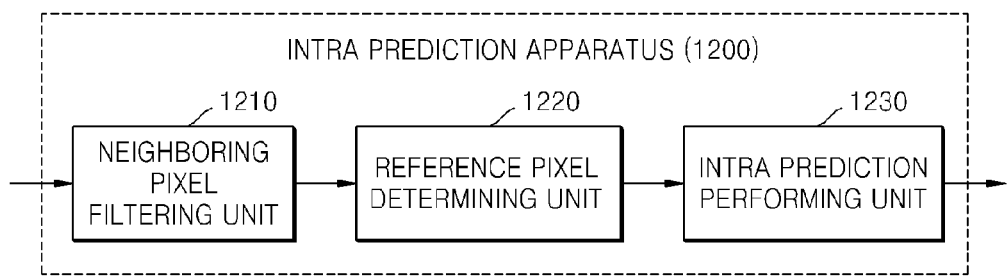
FIG. 14 is a block diagram of an intra prediction apparatus according to an exemplary embodiment.
FIG. 15 is a table showing the numbers of intra prediction modes according to the sizes of coding units, according to an exemplary embodiment.

FIG. 14 is a block diagram of an intra prediction apparatus 1200 according to an exemplary embodiment.

Referring to FIG. 14, the intra prediction apparatus 1200 includes a neighboring pixel filtering unit 1210, a reference pixel determining unit 1220, and an intra prediction performing unit 1230.

The neighboring pixel filtering unit 1210 filters neighboring pixels used to perform intra prediction on a current coding unit to be encoded so as to generate filtered neighboring pixels. The filtering of the neighboring pixels will now be described with reference to FIGS. 19 and 20.

Figure 19:
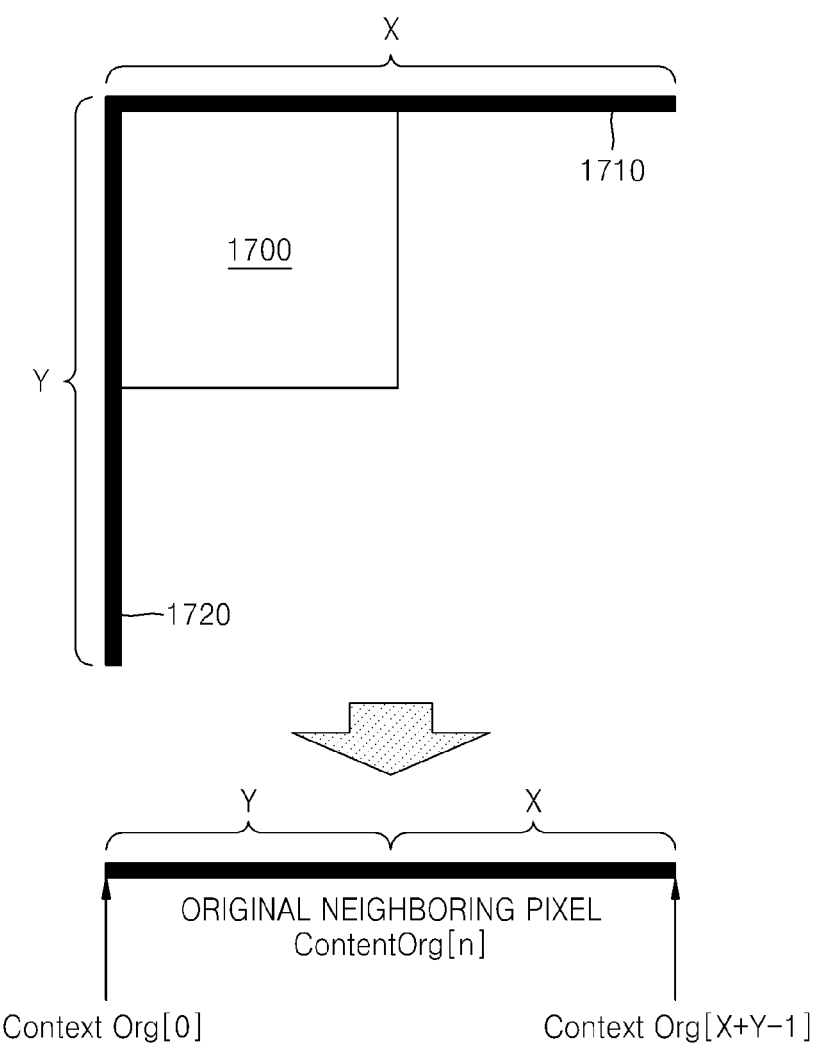
FIG. 19 is a diagram illustrating a current coding unit and neighboring pixels to be filtered, according to an exemplary embodiment.

FIG. 19 is a diagram illustrating a current coding unit 1700 and neighboring pixels 1710 and 1720 to be filtered, according to an exemplary embodiment.

Referring to FIG. 19, the neighboring pixel filtering unit 1210 filters X neighboring pixels 1710 at an upper side of the current coding unit 1700 and Y neighboring pixels 1720 at a left side of the current coding unit 1700 at least once so as to generate filtered neighboring pixels. Here, if the current coding unit 1700 has a size of N×N, the neighboring pixel filtering unit 1210 may filter 4N neighboring pixels such as 2N neighboring pixels 1710 at the upper side of the current coding unit 1700 and 2N neighboring pixels 1720 at the left side of the current coding unit 1700. That is, X=2N and Y=2N. The number of the neighboring pixels 1710 and 1720 filtered by the neighboring pixel filtering unit 1210 is not limited thereto and may be changed in consideration of the directivity of an intra prediction mode applied to the current coding unit 1700.

Also, in FIG. 19, if X+Y original neighboring pixels 1710 and 1720 at the upper and left sides of the current coding unit 1700 are represented by ContextOrg[n] (where n is an integer from 0 to X+Y−1), and a lowermost neighboring pixel of the Y neighboring pixels 1720 has a value of n=0, i.e., ContextOrg[0], a rightmost neighboring pixel of the X neighboring pixels 1710 has a value of n=X+Y−1, i.e., ContextOrg[X+Y−1].

Figure 20:
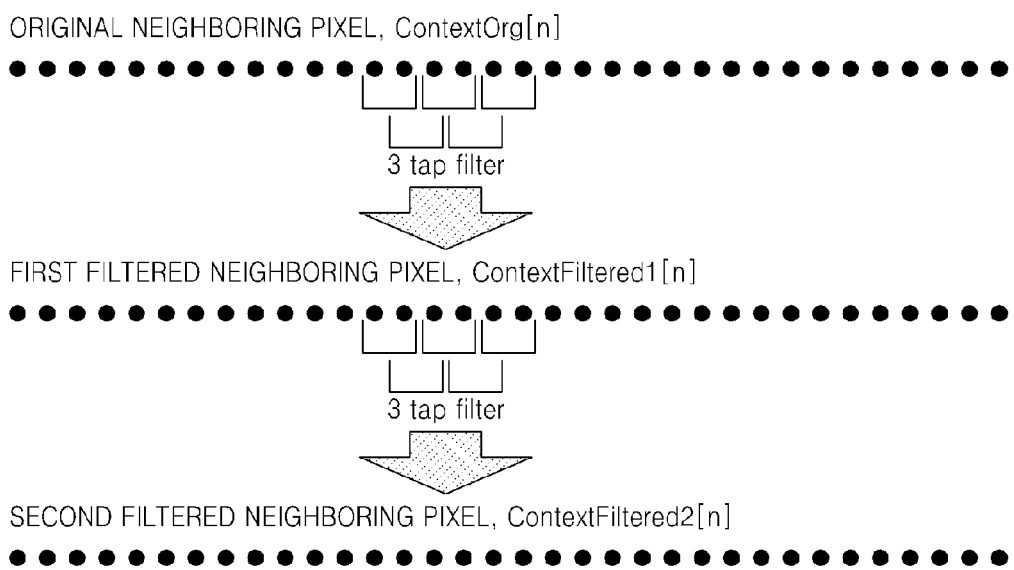
FIG. 20 is a diagram for describing a process of filtering neighboring pixels, according to an exemplary embodiment.

FIG. 20 is a diagram for describing a process of filtering neighboring pixels, according to an exemplary embodiment.

Referring to FIG. 20, if 4N original neighboring pixels at upper and left sides of a current coding unit having a size of N×N are represented by ContextOrg[n] (where n is an integer from 0 to 4N−1), the neighboring pixel filtering unit 1210 filters the original neighboring pixels by calculating weighted average values between the original neighboring pixels so as to generate first filtered neighboring pixels ContextFiltered1[n]. For example, the neighboring pixel filtering unit 1210 generates the first filtered neighboring pixels by applying a 3-tap filter to the original neighboring pixels ContextOrg[n] as represented by Equation (4).

$$ContextFiltered1[n]=(ContextOrg[n-1]+2*ContextOrg[n]+ContextOrg[n+1])/4 \quad (4)$$

Referring to Equation (4), the neighboring pixel filtering unit 1210 calculates a weighted average value of a neighboring pixel ContextOrg[n] to be currently filtered from among the original neighboring pixels and neighboring pixels ContextOrg[n−1] and ContextOrg[n+1] located at left and right sides of the neighboring pixel ContextOrg[n] so as to generate a first filtered neighboring pixel. Outermost filtered neighboring pixels from among the first filtered neighboring pixels have values of the original neighboring pixels. That is, ContextFiltered1[0]=ContextOrg[0] and ContextFiltered1[4N−1]=ContextOrg[4N−1].

Similarly, the neighboring pixel filtering unit 1210 may calculate weighted average values between the first filtered neighboring pixels ContextFiltered1[n] so as to generate second filtered neighboring pixels ContextFiltered2[n]. For example, the neighboring pixel filtering unit 1210 generates the second filtered neighboring pixels by applying a 3-tap filter to the first filtered neighboring pixels ContextFiltered1[n] as represented by Equation (5).

$$ContextFiltered2[n]=(ContextFiltered1[n-1]+2*ContextFiltered1[n]+ContextFiltered1[n+1])/4 \quad (5)$$

Referring to Equation (5), the neighboring pixel filtering unit 1210 calculates a weighted average value of a neighboring pixel ContextFiltered1[n] to be currently filtered from among the first filtered neighboring pixels and neighboring pixels ContextFiltered1[n−1] and ContextFiltered1[n+1] located at left and right sides of the neighboring pixel ContextFiltered1[n] so as to generate a second filtered neighboring pixel. Outermost filtered neighboring pixels from among the second filtered neighboring pixels have values of the first neighboring pixels. That is, ContextFiltered2[0]=ContextFiltered1[0] and ContextFiltered2[4N−1]=ContextFiltered1

[4N−1]. The above-described neighboring pixel filtering process may be repeated more than twice. Also, the number of taps of a filter for filtering neighboring pixels is not limited to three as described above and may be variably changed. Also, the number of taps of a filter and coefficient of the filter for filtering neighboring pixels can be adaptively applied.

The reference pixel determining unit 1220 determines the filtered neighboring pixels or the original neighboring pixels as reference pixels to be used to perform intra prediction on the current coding unit. In more detail, the reference pixel determining unit 1220 selects the original neighboring pixels, the first filtered neighboring pixels, or the second filtered neighboring pixels as the reference pixels according to the size of the current coding unit and the type of an intra prediction mode to be currently performed. For example, if a reference index of a prediction mode using the original neighboring pixels is 0, a reference index of a prediction mode using the first filtered neighboring pixels is 1, and a reference index of a prediction mode using the second filtered neighboring pixels is 2, the reference pixel determining unit 1220 may determine the type of neighboring pixels to be used to perform intra prediction according to the size of the current coding unit and the type of an intra prediction mode to be currently performed, as shown in Table 2.

TABLE 2

| Prediction Mode | Size of Coding Unit | | | | | |
|---|---|---|---|---|---|---|
| | 4 × 4 | 8 × 8 | 16 × 16 | 32 × 32 | 64 × 64 | N × N (N > 64) |
| 0 | | | | | | |
| 1 | 0 | 1 | 0 | 0 | 0 | 0 |
| 2 | 0 | 1 | 0 | 0 | 0 | 0 |
| 3 | 0 | 1 | 0 | 0 | 0 | 0 |
| 4 | 0 | 1 | 0 | 0 | 0 | 0 |
| 5 | 1 | 2 | 2 | 2 | 2 | 2 |
| 6 | 1 | 2 | 2 | 2 | — | — |
| 7 | 1 | 2 | 2 | 2 | — | — |
| 8 | 1 | 2 | 2 | 2 | — | — |
| 9 | — | — | 2 | 2 | — | — |
| 10 | — | — | 2 | 2 | — | — |
| 11 | — | — | 2 | 2 | — | — |
| 12 | — | — | 2 | 2 | — | — |
| 13 | — | — | 2 | 2 | — | — |
| 14 | — | — | 2 | 2 | — | — |
| 15 | — | — | 2 | 2 | — | — |
| 16 | — | — | 2 | 2 | — | — |
| 17 | — | — | 2 | 2 | — | — |
| 18 | — | — | 2 | 2 | — | — |
| 19 | — | — | 2 | 2 | — | — |
| 20 | — | — | 2 | 2 | — | — |
| 21 | — | — | 2 | 2 | — | — |
| 22 | — | — | 2 | 2 | — | — |
| 23 | — | — | 2 | 2 | — | — |
| 24 | — | — | 2 | 2 | — | — |
| 25 | — | — | 2 | 2 | — | — |
| 26 | — | — | 2 | 2 | — | — |
| 27 | — | — | 2 | 2 | — | — |
| 28 | — | — | 2 | 2 | — | — |
| 29 | — | — | 2 | 2 | — | — |
| 30 | — | — | 2 | 2 | — | — |
| 31 | — | — | 2 | 2 | — | — |
| 32 | — | — | 2 | 2 | — | — |

Referring to Table 2, for example, if the current coding unit has a size of 32×32 and intra prediction is performed by using intra prediction mode 4, a reference index is 0 and thus the reference pixel determining unit 1220 determines the original neighboring pixels ContextOrg[n] as the reference pixel to be used to perform intra prediction on the current coding unit. The intra prediction modes in Table 2 represent intra prediction modes shown in Table 3. Also, "-" in Table 2 represents that an intra prediction mode for a corresponding size of a coding unit is not defined. Table 2 is based on the intra prediction modes shown in Table 3, and is exemplarily shown. Unlike Table 3, as long as different intra prediction modes are set according to the sizes of coding units, the reference indices in Table 2 may be differently set.

Referring back to FIG. 14, if the reference pixel determining unit 1220 determines reference pixels to be used to perform intra prediction on the current coding unit from among the original neighboring pixels and the filtered neighboring pixels, the intra prediction performing unit 1230 performs intra prediction by using the determined reference pixels according to an intra prediction mode that is available according to the size of the current coding unit, so as to generate a prediction coding unit.

FIG. 15 is a table showing the numbers of intra prediction modes according to the sizes of coding units, according to an exemplary embodiment.

According to an exemplary embodiment, the number of intra prediction modes to be applied to a coding unit (a decoding unit in a decoding process) may be variably set. For example, referring to FIG. 15, if the size of a coding unit on which intra prediction is performed is N×N, the numbers of intra prediction modes actually performed on 2×2, 4×4, 8×8, 16×16, 32×32, 64×64, and 128×128-sized coding units may be respectively set as 5, 9, 9, 17, 33, 5, and 5(in Example 2). For another example, when a size of a coding unit to be intra-predicted is N×N, numbers of intra prediction modes to be actually performed on coding units having sizes of 2×2, 4×4, 8×8, 16×16, 32×32, 64×64, and 128×128 may be set to be 3, 17, 34, 34, 34, 5, and 5. The numbers of intra prediction modes to be actually performed are differently set according to the sizes of coding units because overheads for encoding prediction mode information differ according to the sizes of coding units. In other words, a small coding unit occupies a small portion of entire image data but may have a large overhead in order to transmit additional information such as prediction mode information of the coding unit. Accordingly, if a small coding unit is encoded by using an excessively large number of prediction modes, the number of bits may be increased and thus compression efficiency may be reduced. Also, a large coding unit, e.g., a coding unit equal to or greater than 64×64, generally corresponds to a plain region of image data, and thus encoding of the large coding unit by using an excessively large number of prediction modes may also reduce compression efficiency.

Thus, according to an exemplary embodiment, coding units are roughly classified into at least three sizes such as N1×N1 (where 2≤N1≤4, and N1 is an integer), N2×N2 (where 8≤N2≤32, and N2 is an integer), and N3×N3 (where 64≤N3, and N3 is an integer). If the number of intra prediction modes performed on the coding units of N1×N1 is A1 (where A1 is a positive integer), the number of intra prediction modes performed on the coding units of N2×N2 is A2 (where A2 is a positive integer), and the number of intra prediction modes performed on the coding units of N3×N3 is A3 (where A3 is a positive integer), the numbers of intra prediction modes performed according to the sizes of the coding units may be set to satisfy A3≤A1≤A2. That is, if a current picture is split into small coding units, medium coding units, and large coding units, the medium coding units may be set to have the largest number of prediction modes and the small coding units and the large coding units may be set to have a relatively small number of prediction modes. However, the exemplary embodiment is not limited thereto and the small and large coding units may also be set to have a large number of prediction modes. The numbers of prediction modes according to the sizes of coding units in FIG. 15 are exemplarily shown and may be changed.

Figures 16A, 16B:
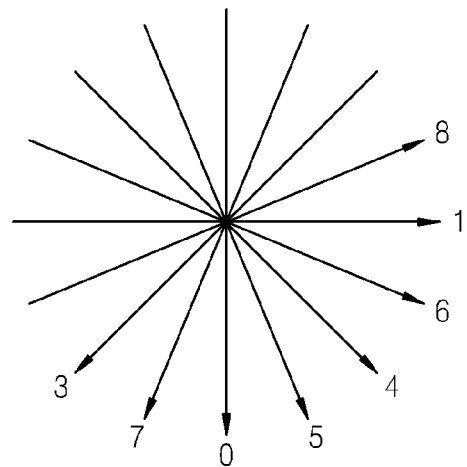
FIGS. 16A through 16C illustrate intra prediction modes applied to a coding unit having a predetermined size, according to an exemplary embodiment.

FIG. 16A is a table showing intra prediction modes applied to a coding unit having a predetermined size, according to an exemplary embodiment.

Referring to FIGS. 15 and 16A, for example, when intra prediction is performed on a coding unit having a 4×4 size, a vertical mode (mode 0), the coding unit may have a horizontal mode (mode 1), a direct current (DC) mode (mode 2), a diagonal down-left mode (mode 3), a diagonal down-right mode (mode 4), a vertical-right mode (mode 5), a horizontal-down mode (mode 6), a vertical-left mode (mode 7), and a horizontal-up mode (mode 8).

FIG. 16B illustrates directions of the intra prediction modes shown in FIG. 16A. In FIG. 16B, numbers at ends of arrows represent prediction modes corresponding to prediction directions indicated by the arrows. Here, mode 2 is a DC mode having no directivity and thus is not shown in FIG. 16B.

Figure 16C:
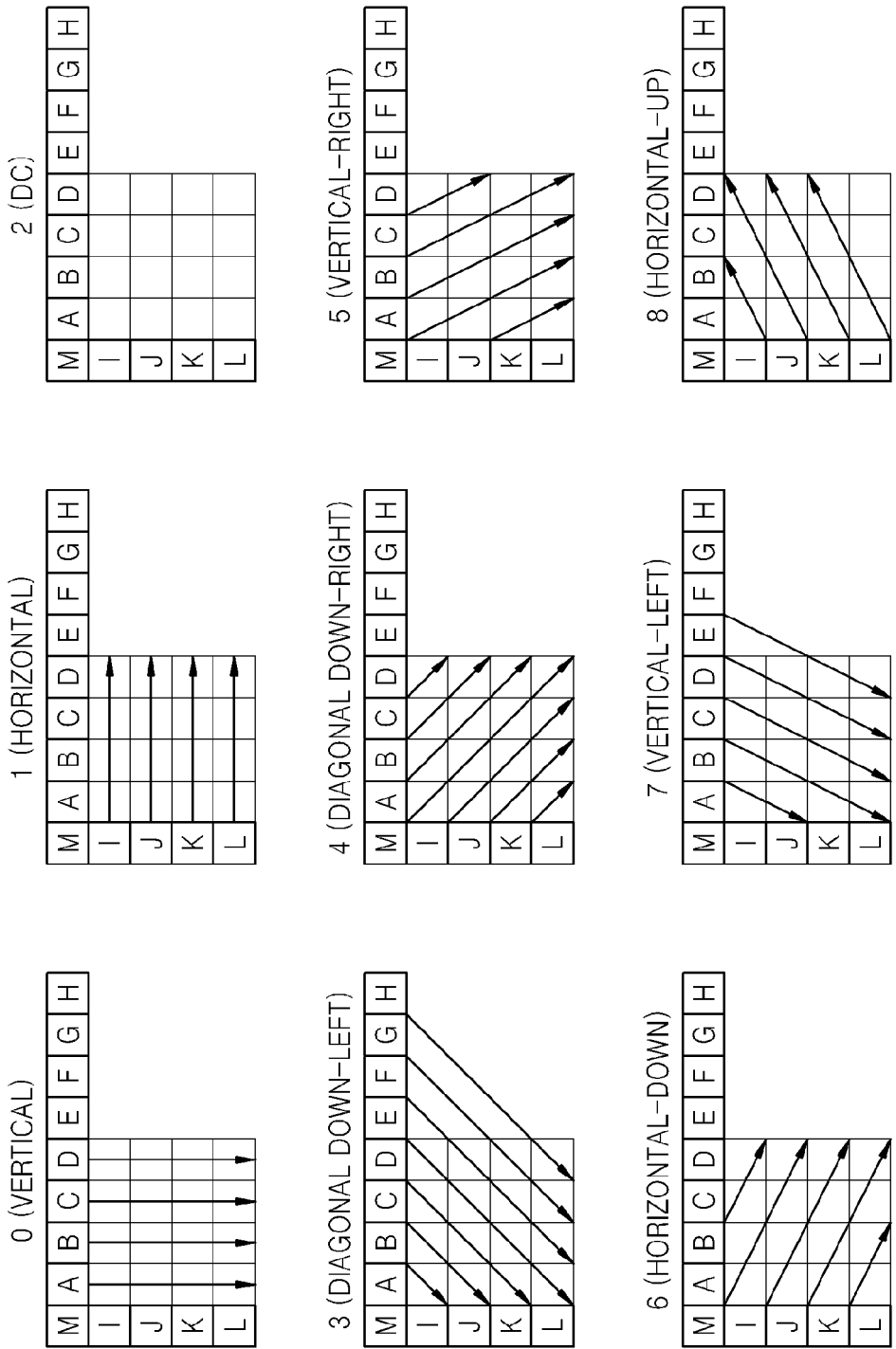

FIG. 16C is a diagram for describing a method of performing intra prediction on a coding unit by using the intra prediction modes shown in FIG. 16A.

Referring to FIG. 16C, a prediction coding unit is generated by performing an available intra prediction mode determined according to the size of a current coding unit by using neighboring pixels A through M of the current coding unit. For example, an operation of performing prediction encoding on a current coding unit having a 4×4 size according to mode 0, i.e., a vertical mode, shown in FIG. 16A will be described. Initially, values of the neighboring pixels A through D at an upper side of the current coding unit are predicted as pixel values of the current coding unit. That is, the value of the neighboring pixel A is predicted as a value of four pixels in a first column of the current coding unit, the value of the neighboring pixel B is predicted as a value of four pixels in a second column of the current coding unit, the value of the neighboring pixel C is predicted as a value of four pixels in a third column of the current coding unit, and the value of the neighboring pixel D is predicted as a value of four pixels in a fourth column of the current coding unit. After that, the pixel values of the current coding unit predicted by using the neighboring pixels A through D are subtracted from the pixel values of the original current coding unit so as to calculate an error value and then the error value is encoded. Meanwhile, when various intra prediction modes are applied, neighboring pixels used as reference pixels may be original neighboring pixels or filtered neighboring pixels as described above.

Figure 17:
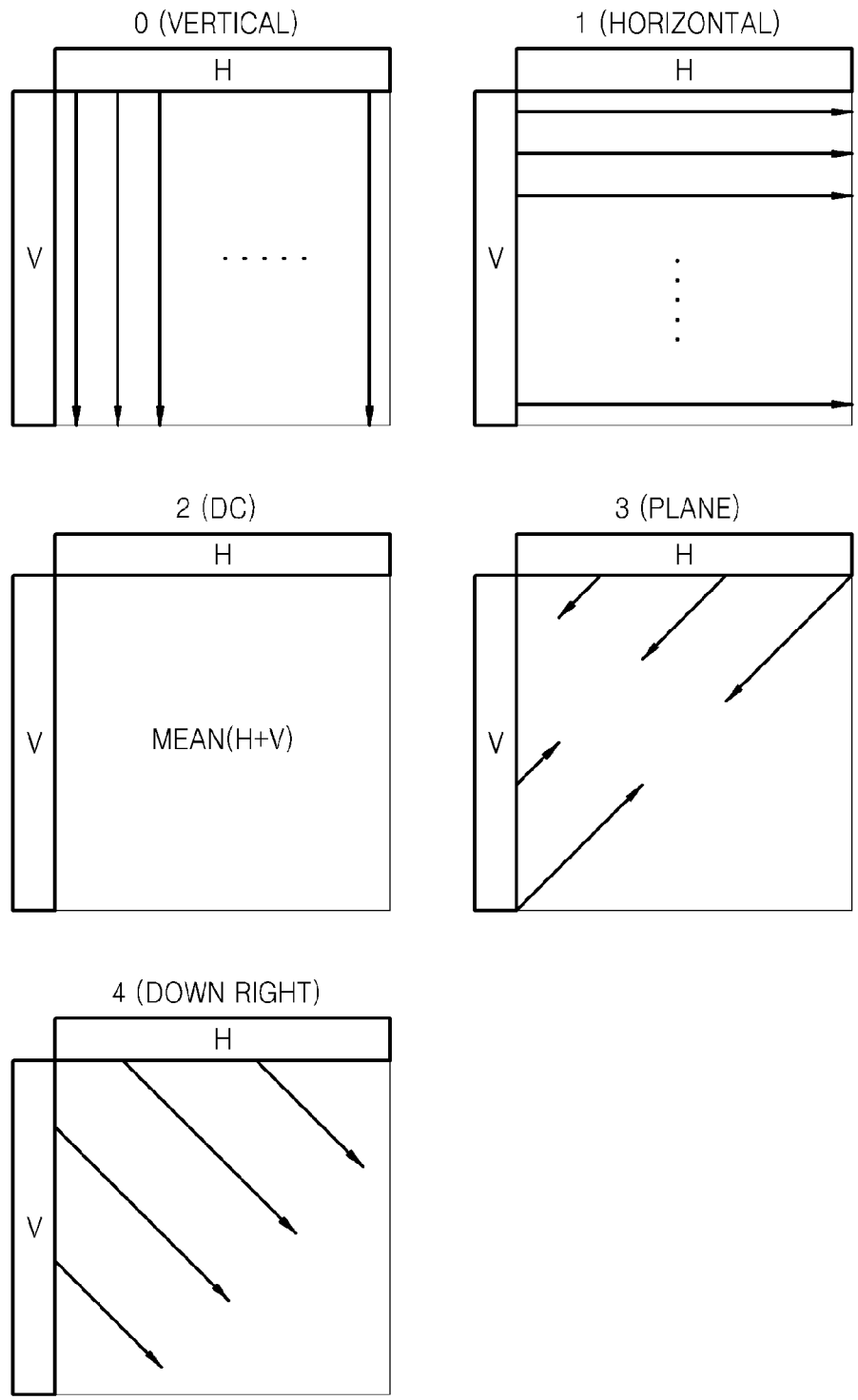
FIG. 17 illustrates intra prediction modes applied to a coding unit having a predetermined size, according to another exemplary embodiment.

FIG. 17 illustrates intra prediction modes applied to a coding unit having a predetermined size, according to another exemplary embodiment.

Referring to FIGS. 15 and 17, for example, when intra prediction is performed on a coding unit having a 2×2 size, the coding unit may have totally five modes such as a vertical mode, a horizontal mode, a DC mode, a plane mode, and a diagonal down-right mode.

Meanwhile, if a coding unit having a 32×32 size has 33 intra prediction modes as shown in FIG. 15, directions of the 33 intra prediction modes need to be set. According to an exemplary embodiment, in order to set intra prediction mode having various directions in addition to the intra prediction modes illustrated in FIGS. 16A through 16C, and 17, prediction directions for selecting neighboring pixels used as reference pixels of pixels of the coding unit are set by using (dx, dy) parameters. For example, if each of the 33 prediction modes is defined as mode N (where N is an integer from 0 to 32), mode 0 may be set as a vertical mode, mode 1 may be set as a horizontal mode, mode 2 may be set as a DC mode, mode 3 may be set as a plane mode, and each of mode 4 through mode 31 may be defined as a prediction mode having a directivity of $\tan^{-1}(dy/dx)$ by using (dx, dy) represented as one of (1,−1), (1,1), (1,2), (2,1), (1,−2), (2,1), (1,−2), (2,−1), (2,−11), (5,−7), (10,−7), (11,3), (4,3), (1,11), (1,−1), (12,−3), (1,−11), (1,−7), (3,−10), (5,−6), (7,−6), (7,−4), (11,1), (6,1), (8,3), (5,3), (5,7), (2,7), (5,−7), and (4,−3) shown in Table 3.

TABLE 3

| mode # | dx | dy |
|---|---|---|
| mode 4 | 1 | −1 |
| mode 5 | 1 | 1 |
| mode 6 | 1 | 2 |
| mode 7 | 2 | 1 |
| mode 8 | 1 | −2 |
| mode 9 | 2 | −1 |
| mode 10 | 2 | −11 |
| mode 11 | 5 | −7 |
| mode 12 | 10 | −7 |
| mode 13 | 11 | 3 |
| mode 14 | 4 | 3 |
| mode 15 | 1 | 11 |
| mode 16 | 1 | −1 |
| mode 17 | 12 | −3 |
| mode 18 | 1 | −11 |
| mode 19 | 1 | −7 |
| mode 20 | 3 | −10 |
| mode 21 | 5 | −6 |
| mode 22 | 7 | −6 |
| mode 23 | 7 | −4 |
| mode 24 | 11 | 1 |
| mode 25 | 6 | 1 |
| mode 26 | 8 | 3 |
| mode 27 | 5 | 3 |
| mode 28 | 5 | 7 |
| mode 29 | 2 | 7 |
| mode 30 | 5 | −7 |
| mode 31 | 4 | −3 |

Mode 0 is a vertical mode, mode 1 is a horizontal mode, mode 2 is a DC mode, mode 3 is a plane mode, and mode 32 is a bi-linear mode.

Figure 18A:
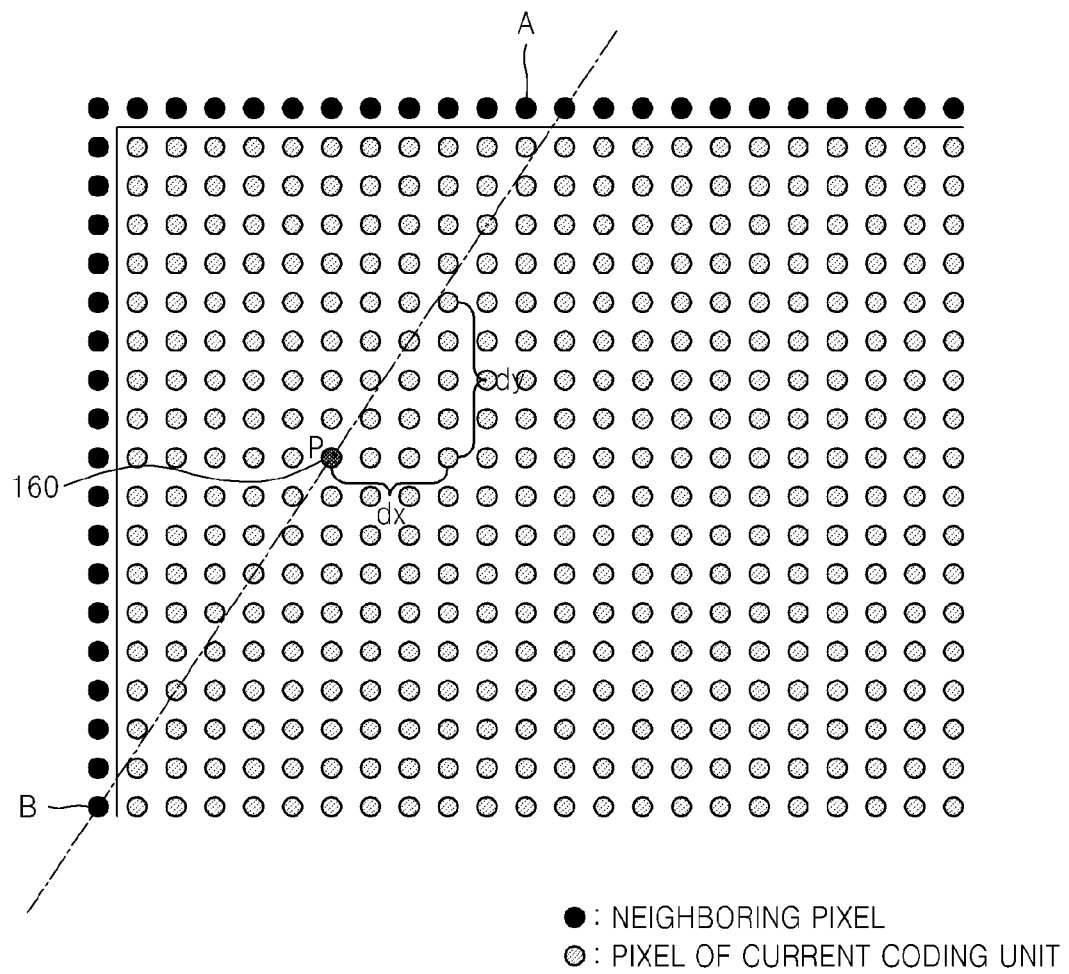
FIGS. 18A through 18C are diagrams for describing intra prediction modes having various directivities, according to an exemplary embodiment.
Figure 18B:
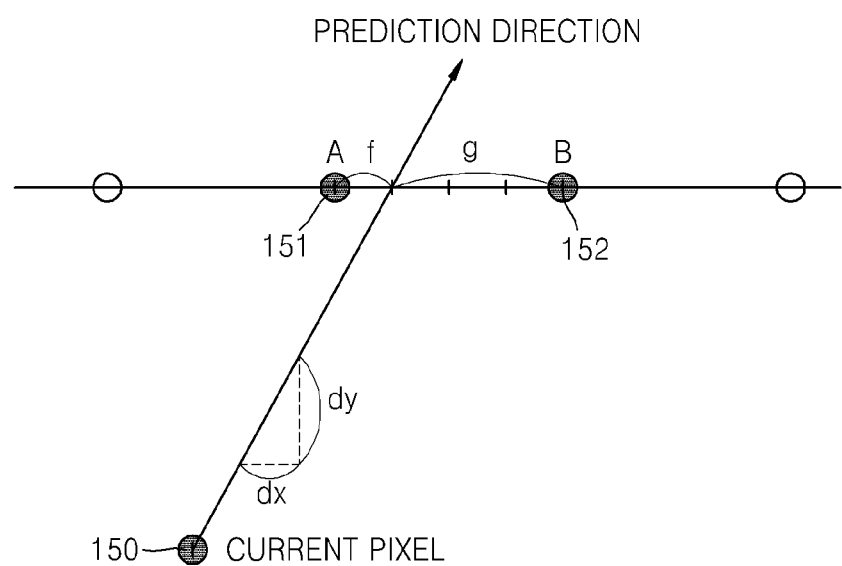
Figure 18C:
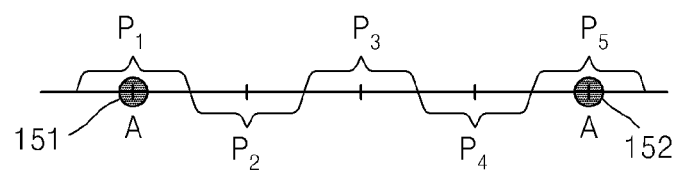

FIGS. 18A through 18C are diagrams for describing intra prediction modes having various directivities, according to an exemplary embodiment.

As described above in relation to Table 3, intra prediction modes according to an exemplary embodiment may have various directivities of $\tan^{-1}(dy/dx)$ by using a plurality of (dx, dy) parameters.

Referring to FIG. 18A, neighboring pixels A and B on an extension line 160 having an angle of $\tan^{-1}(dy/dx)$ according to (dx, dy) values in Table 3 with respect to a current pixel P in a current coding unit to be predicted may be used as a predictor of the current pixel P. In this case, neighboring pixels used as a predictor may be previously encoded and restored pixels of a previous coding unit at upper and left sides of a current coding unit. Also, if the extension line 160 passes between two neighboring pixels positioned at integer locations, one of the neighboring pixels closer to the extension line 160 than the other may be used as the predictor of the current pixel P.

Also, if the extension line 160 passes between two neighboring pixels positioned at integer locations, one of the neighboring pixels closer to the current pixel P than the other may be used as the predictor of the current pixel P, or a weighted average value calculated in consideration of distances from the neighboring pixels to a crossing of the extension line 160 and a line between the neighboring pixels may be used as the predictor of the current pixel P.

FIGS. 18B and 18C are diagrams for describing a process of generating a predictor when the extension line 160 passes between two neighboring pixels positioned at integer locations, according to an exemplary embodiment.

Referring to FIG. 18B, if the extension line 160 having an angle of $\tan^{-1}(dy/dx)$ to be determined according to a (dx, dy) value of each mode passes between neighboring pixels A 151 and B 152 positioned at integer locations, as described above, one of the neighboring pixels A 151 and B 152 closer to the extension line 160 or a weighted average value calculated in consideration of distances from the neighboring pixels A 151 and B 152 to a crossing of the extension line 160 and a line between the neighboring pixels A 151 and B 152 may be used as a predictor of the current pixel P. For example, if the distance between the crossing and the neighboring pixel A 151 is f and the distance between the crossing and the neighboring pixel B 152 is g, the predictor of the current pixel P may be obtained as $(A*g+B*f)/(f+g)$. Here, f and g may be distances regulated as integers. In actual software or hardware implementation, the predictor of the current pixel P may be obtained by performing a shift operation such as $(g*A+f*B+2)>>2$. As illustrated in FIG. 18B, if the extension line 160 passes a 1/4 location between the neighboring pixels A 151 and B 152, which is closer to the neighboring pixel A 151, the predictor of the current pixel P may be obtained as $(3*A+B)/4$. This value may be obtained by performing a shift operation such as $(3*A+B+2)>>2$ in consideration of rounding off.

Meanwhile, if the extension line 160 passes between the neighboring pixels A 151 and B 152, the section between the neighboring pixels A 151 and B 152 may be slit into a predetermined number of sections, and a weighted average value calculated in consideration of distances between the crossing and the neighboring pixels A 151 and B 152 in each section may be used as the predictor. For example, referring to FIG. 18C, the section between the neighboring pixels A 151 and B 152 is split into five sections P1 through P5, a representative weighted average value calculated in consideration of distances between the crossing and the neighboring pixels A 151 and B 152 in each section may be determined and may be used as the predictor of the current pixel P. In more detail, if the extension line 160 passes section P1, a value of the neighboring pixel A 151 may be determined as the predictor of the current pixel P. If the extension line 160 passes section P2, a weighted average value calculated in consideration of distances between the center of section P2 and the neighboring pixels A 151 and B 152, i.e., $(3*A+1*B+2)>>2$, may be determined as the predictor of the current pixel P. If the extension line 160 passes section P3, a weighted average value calculated in consideration of distances between the center of section P3 and the neighboring pixels A 151 and B 152, i.e., $(2*A+2*B+2)>>2$, may be determined as the predictor of the current pixel P. If the extension line 160 passes section P4, a weighted average value calculated in consideration of distances between the center of section P4 and the neighboring pixels A 151 and B 152, i.e., $(1*A+3*B+2)>>2$, may be determined as the predictor of the current pixel P. If the extension line 160 passes section P5, a value of the neighboring pixel B 152 may be determined as the predictor of the current pixel P.

Also, as illustrated in FIG. 18A, if the extension line 160 meets two neighboring pixels such as the neighboring pixel A at an upper side and the neighboring pixel B at a left side, an average value of the neighboring pixels A and B may be used as the predictor of the current pixel P. Alternatively, the neighboring pixel A may be used if a value of dx*dy is a positive number, and the neighboring pixel B may be used if the value of dx*dy is a negative number. Also, neighboring pixels used as reference pixels may be original neighboring pixels or filtered neighboring pixels as described above.

The intra prediction modes having various directivities in Table 3 may be previously set at an encoder side and a decoder side, and thus each coding unit may transmit indices corresponding to only the set intra prediction modes.

According to an exemplary embodiment, as prediction encoding is performed according to the intra prediction modes variably set according to the size of a coding unit, compression efficiency of an image may be improved according to image characteristics. Also, according to an exemplary embodiment, as original neighboring pixels and filtered neighboring pixels are selectively used to perform intra prediction, prediction may be performed more variably and thus compression efficiency of an image may be improved.

According to another exemplary embodiment, instead of using neighboring pixels previously determined according to the size of a current coding unit and the type of the intra prediction mode to be currently performed, the intra prediction performing unit 1230 may perform prediction on a current coding unit according to an available intra prediction mode by separately using original neighboring pixels, first filtered neighboring pixels, and second filtered neighboring pixels as reference pixels, and the reference pixel determining unit 1220 may select neighboring pixels having minimum costs as reference pixels to be ultimately used to perform intra prediction on the current coding unit.

Figure 21:
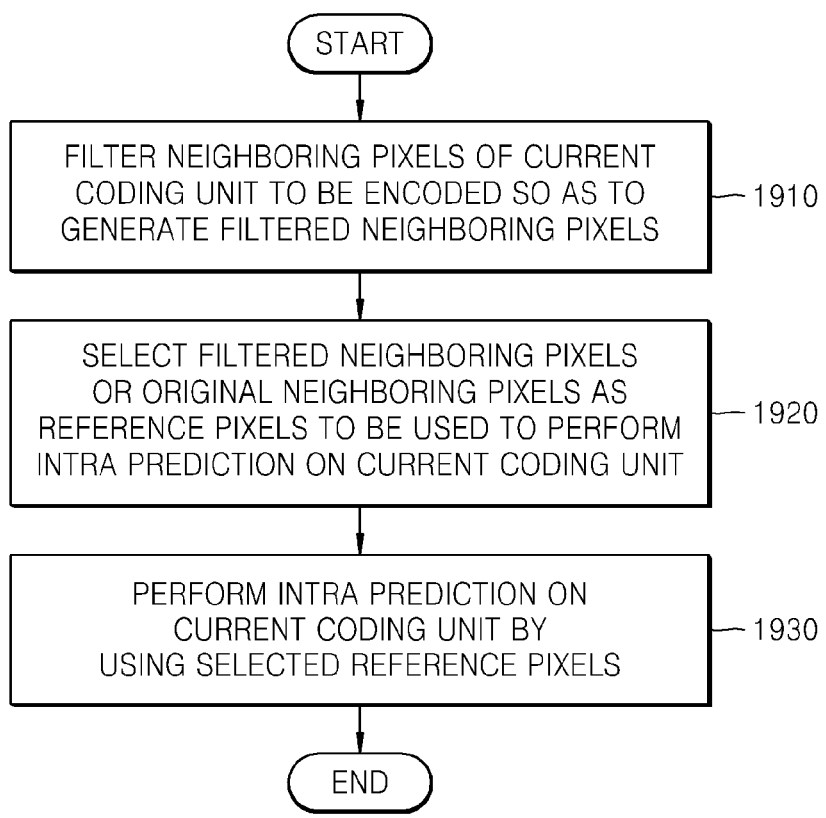
FIG. 21 is a flowchart illustrating a video encoding method according to an exemplary embodiment.

FIG. 21 is a flowchart illustrating a video encoding method according to an exemplary embodiment.

Referring to FIG. 21, in operation 1910, neighboring pixels of a current coding unit to be encoded are filtered to generate filtered neighboring pixels. As described above, the neighboring pixel filtering unit 1210 filters neighboring pixels at upper and left sides of the current coding unit at least once so as to generate the filtered neighboring pixel. Here, a coding unit may be obtained by splitting a current picture based on a maximum coding unit that is a coding unit having a maximum size, and a coded depth that is hierarchical split information of the maximum coding unit.

In operation 1920, the filtered neighboring pixels or the original neighboring pixels are selected as reference pixels to be used to perform intra prediction on the current coding unit. As described above, the reference pixel determining unit 1220 may select the reference pixels according to the size of the current coding unit and the type of an intra prediction mode to be currently performed, as shown in Table 2. According to another exemplary embodiment, the reference pixel determining unit 1220 may compare resultant costs of intra prediction encoding performed by separately using the original neighboring pixel and the filtered neighboring pixels, and may determine the neighboring pixel to be ultimately used to perform intra prediction. Also, the reference pixel determining unit 1220 may signal to indicate which neighboring pixel are selected among the original neighboring pixels and the filtered neighboring pixels to perform intra prediction on the current coding unit. In other words, intra prediction mode information may comprise reference index information indicating which neighboring pixel are selected among the original neighboring pixels and the filtered neighboring pixels to perform intra prediction on the current coding unit. When the reference pixels to be used are preset at an encoding end and a decoding end as shown in Table 2, the reference index information need not to be transmitted.

In operation 1930, intra prediction is performed on the current coding unit by using the selected reference pixels. As described above, the intra prediction performing unit 1230 generates a prediction coding unit by performing intra prediction on the current coding unit by applying an intra prediction mode that is available in the current coding unit by using the selected reference pixels, and outputs the prediction coding unit.

Figure 22:
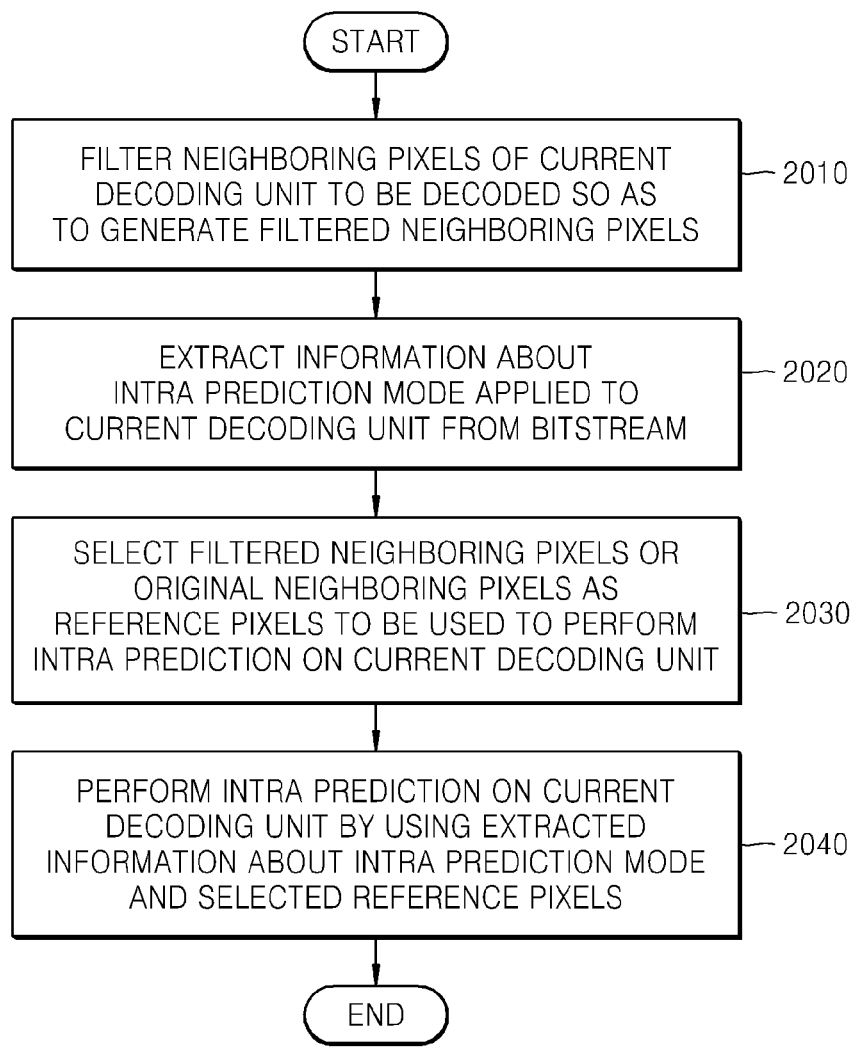
FIG. 22 is a flowchart illustrating a video decoding method according to an exemplary embodiment.

FIG. 22 is a flowchart illustrating a video decoding method according to an exemplary embodiment.

Referring to FIG. 22, in operation 2010, neighboring pixels of a current decoding unit to be decoded are filtered to generate filtered neighboring pixels.

In operation 2020, information about an intra prediction mode applied to the current decoding unit is extracted from a bitstream. The information about the intra prediction mode may include information about an intra prediction mode applied to the current decoding unit and information about a reference index representing whether original neighboring pixels or filtered neighboring pixels are used as reference pixels. If, as shown in Table 1, the same type of reference pixels to be used according to the intra prediction mode and the size of the current decoding unit is set at an encoder side and a decoder side, the information about the reference index is not necessarily transmitted.

In operation 2030, the filtered neighboring pixels or the original neighboring pixels are selected as reference pixels to be used to perform intra prediction on the current decoding unit. As described above, if the information about the reference index is additionally included in the bitstream, the reference pixels are selected according to the extracted information about the reference index. If, as shown in Table 2, reference pixels may be determined based on the size and the intra prediction mode of the current decoding unit, the original neighboring pixels or the filtered neighboring pixels to be used as the reference pixels may be determined based on the size and the intra prediction mode of the current decoding unit.

In operation 2040, intra prediction is performed on the current decoding unit by using the extracted information about the intra prediction mode and the selected reference pixels.

The present invention can also be embodied as computer readable code on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion.

While the present invention has been particularly shown and described with reference to exemplary embodiments thereof, it will be understood by one of ordinary skill in the art that various changes in form and details may be made therein without departing from the spirit and scope of the invention as defined by the following claims. The exemplary embodiments should be considered in a descriptive sense only and not for purposes of limitation. Therefore, the scope of the invention is defined not by the detailed description of the invention but by the following claims, and all differences within the scope will be construed as being included in the present invention.

What is claimed is:

1. A method of decoding an image, the method comprising:
   extracting information that includes an intra prediction mode of a current block to be decoded, from a bitstream;
   determining one of neighboring pixels adjacent to the current block and filtered neighboring pixels as reference pixels, based on a size of the current block and the intra prediction mode of the current block;
   performing intra prediction on the current block using the intra prediction mode of the current block and the determined reference pixels,
   wherein the image is split into a plurality of maximum coding units, according to information about a maximum size of a coding unit,
   wherein a coding unit of a current depth is one of rectangular data units split from a coding unit of an upper depth,
   wherein the coding unit is split into coding units of a lower depth, independently from neighboring coding units, and
   wherein the coding unit of the current depth is split into at least one prediction unit.

2. The method of claim 1, wherein the determining comprises:
   selecting a predetermined number of the neighboring pixels based on the size of the current block; and
   filtering the selected predetermined number of the neighboring pixels, to generate the filtered neighboring pixels.

3. The method of claim 2, wherein the size of the current block is N×N, and the predetermined number of neighboring pixels comprises 2N neighboring pixels adjacent to an upper side and an upper right side of the current block and 2N neighboring pixels adjacent to a left side and a below left side of the current block.

4. The method of claim 1, wherein the filtered neighboring pixels are obtained by using weighted average values of the neighboring pixels.

5. The method of claim 1, wherein the performing of the intra prediction is performed according to a prediction mode for performing intra prediction by using the neighboring pixels selected based on a line extending through a current pixel, the line having an angle of $\tan^{-1}(dy/dx)$, wherein dx and dy are integers, with respect to the current pixel.

* * * * *